(12) United States Patent  (10) Patent No.: US 8,499,756 B2
Bathurst et al.  (45) Date of Patent: Aug. 6, 2013

(54) THERMAL-MECHANICAL POSITIONING FOR RADIATION TRACKING

(75) Inventors: Stephen P. Bathurst, Somerville, MA (US); Andrew W. Carvey, Cambridge, MA (US); Eric D. Cohen, Cambridge, MA (US); Jordan V. Etra, Somerville, MA (US); Forrest W. Liau, Cambridge, MA (US); George C. Whitfield, Woburn, MA (US)

(73) Assignee: SunPoint Technologies, Inc., Cambridge, MA (US)

( * ) Notice: Subject to any disclaimer, the term of this patent is extended or adjusted under 35 U.S.C. 154(b) by 581 days.

(21) Appl. No.: 12/771,788

(22) Filed: Apr. 30, 2010

(65) Prior Publication Data

US 2010/0275904 A1 Nov. 4, 2010

Related U.S. Application Data

(60) Provisional application No. 61/174,278, filed on Apr. 30, 2009.

(51) Int. Cl.
*F24J 2/38* (2006.01)
(52) U.S. Cl.
USPC ........... 126/581; 126/600; 126/604; 126/580; 126/579; 126/571; 126/572; 126/573
(58) Field of Classification Search
USPC ................. 126/600, 571, 572, 573, 580, 581, 126/604
See application file for complete search history.

(56) References Cited

U.S. PATENT DOCUMENTS

| 1,976,428 A | | 10/1934 | Arthuys et al. |
| 2,967,249 A | * | 1/1961 | Quirk ............................ 250/215 |
| 3,213,285 A | | 10/1965 | McCusker |
| 3,355,880 A | | 12/1967 | Senft et al. |
| 3,446,998 A | | 5/1969 | Webb |

(Continued)

FOREIGN PATENT DOCUMENTS

| DE | 29908133 U1 * | 7/1999 |
| JP | 58193042 A | 11/1983 |

(Continued)

OTHER PUBLICATIONS

"Solar Tracking Method Using Bimetallic Strips or Coils", Author(s): IBM TDB, Whedon, WT, IP.com No. IPCOM000050324D, Original Publication Date: Oct. 1, 1982, Original Disclosure Information: TDB 10-82 p. 2355-2356, IP.com Electronic Publication: Feb. 10, 2005.*

(Continued)

*Primary Examiner* — Kenneth Rinehart
*Assistant Examiner* — Jorge Pereiro
(74) *Attorney, Agent, or Firm* — Goodwin Procter LLP

(57) ABSTRACT

The invention relates to systems and methods for controlling angular position of a pivotable platform relative to a radiation source. In one embodiment, an apparatus for controlling angular position of a pivotable platform relative to a radiation source includes a frame, a thermal actuation element coupled to the frame, a pivotable platform positioned between the radiation source and the thermal actuation element so as to at least partially block energy from the radiation source from impinging on the thermal actuation element, and apparatus for pivoting the pivotable platform in response to a thermally controlled deformation of the thermal actuation element.

20 Claims, 15 Drawing Sheets

U.S. PATENT DOCUMENTS

| | | | |
|---|---|---|---|
| 3,630,020 A | | 12/1971 | Chase et al. |
| 3,635,015 A | | 1/1972 | Samuels |
| 3,982,526 A | * | 9/1976 | Barak ................. 126/580 |
| 4,014,170 A | * | 3/1977 | Kitterman ................. 60/529 |
| 4,044,752 A | * | 8/1977 | Barak ................. 126/581 |
| 4,226,502 A | * | 10/1980 | Gunzler ................. 126/574 |
| 4,274,394 A | * | 6/1981 | Stromberg ................. 126/581 |
| 4,283,588 A | * | 8/1981 | Zitzelsberger ................. 136/246 |
| 4,304,221 A | | 12/1981 | Trihey |
| 4,318,394 A | * | 3/1982 | Alexander ................. 126/575 |
| 4,387,702 A | | 6/1983 | Murphy et al. |
| 4,628,142 A | * | 12/1986 | Hashizume ................. 136/246 |
| 7,834,303 B2 | * | 11/2010 | Fatehi et al. ................. 250/203.4 |
| 8,110,786 B2 | * | 2/2012 | Sepehry-Fard et al. .... 250/203.4 |
| 2009/0302199 A1 | * | 12/2009 | Sepehry-Fard et al. .... 250/203.4 |
| 2010/0199485 A1 | * | 8/2010 | Dell et al. ................. 29/525.09 |
| 2011/0136020 A1 | * | 6/2011 | Sepehry-Fard et al. ....... 429/400 |

FOREIGN PATENT DOCUMENTS

| | | |
|---|---|---|
| JP | 60097311 A | 5/1985 |
| JP | 04171774 A | 6/1992 |
| JP | 2006278536 A * | 10/2006 |
| JP | 2006278536 A | 10/2006 |
| WO | WO 9211496 A1 * | 7/1992 |

OTHER PUBLICATIONS

Partial International Search Report for PCT/US2010/033192 dated Aug. 2, 2011, 2 pages.

Clifford at al. (2004) "Design of a Novel Passive Solar Tracker", Solar Energy 77:269-280.

* cited by examiner

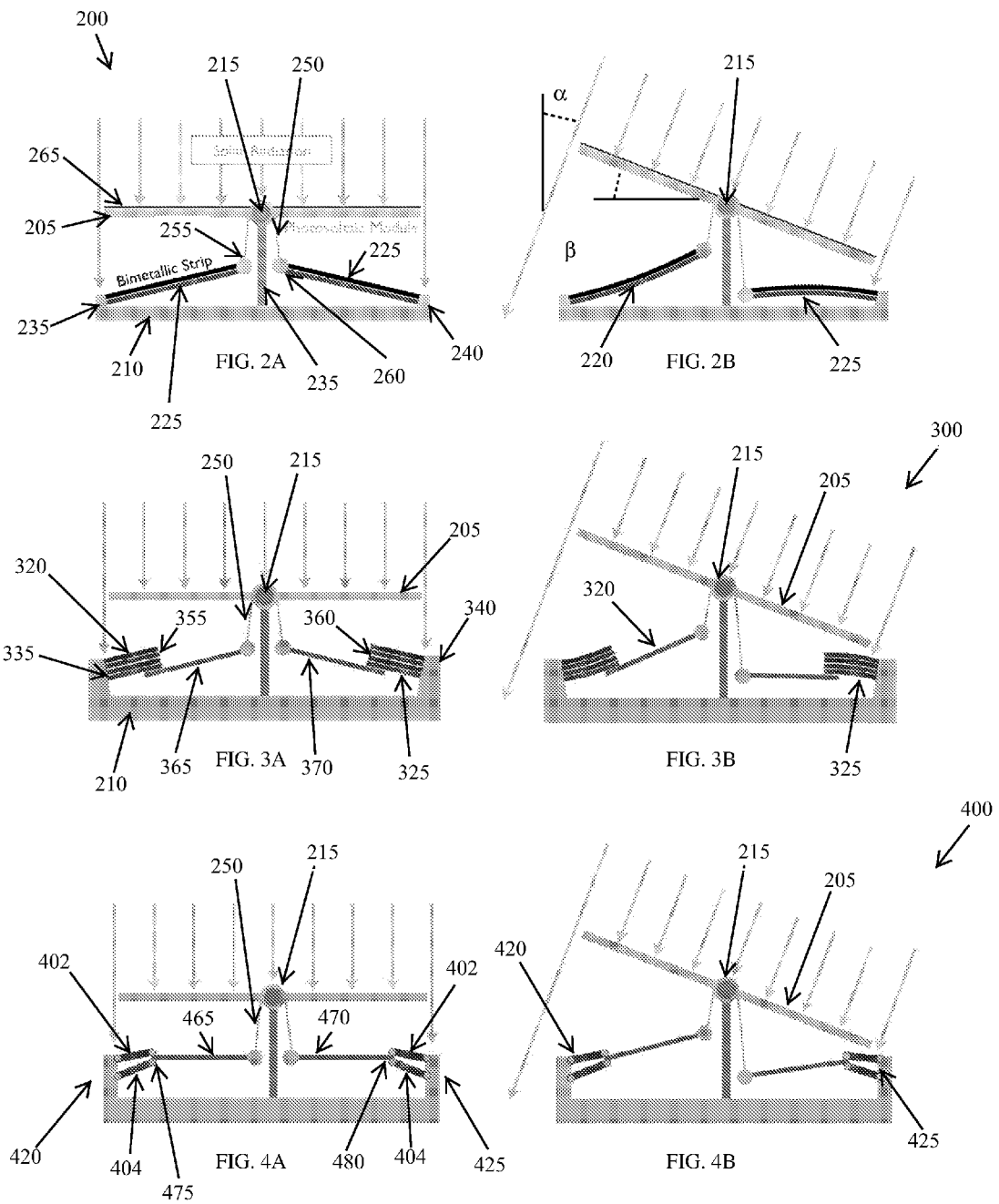

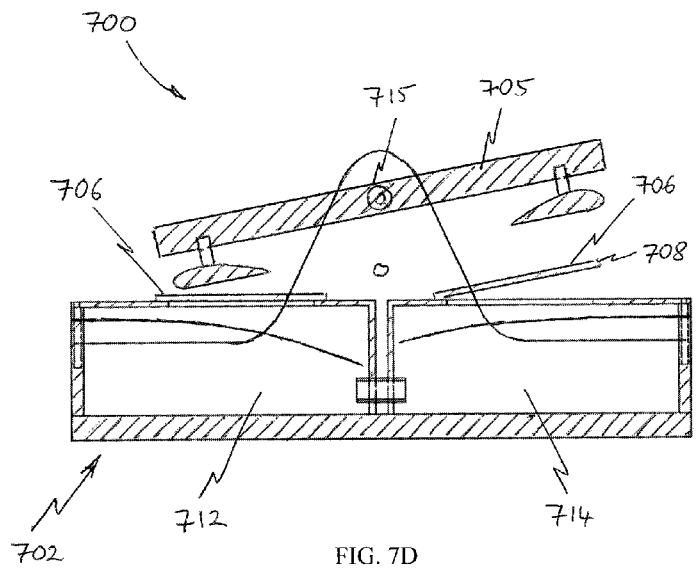
FIG. 7D
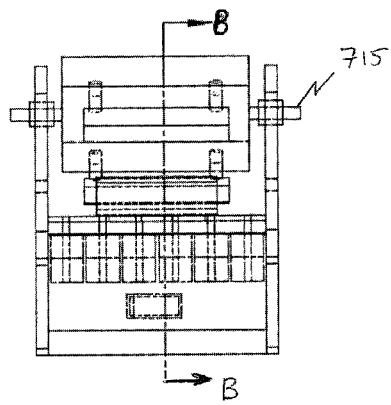
FIG. 7C
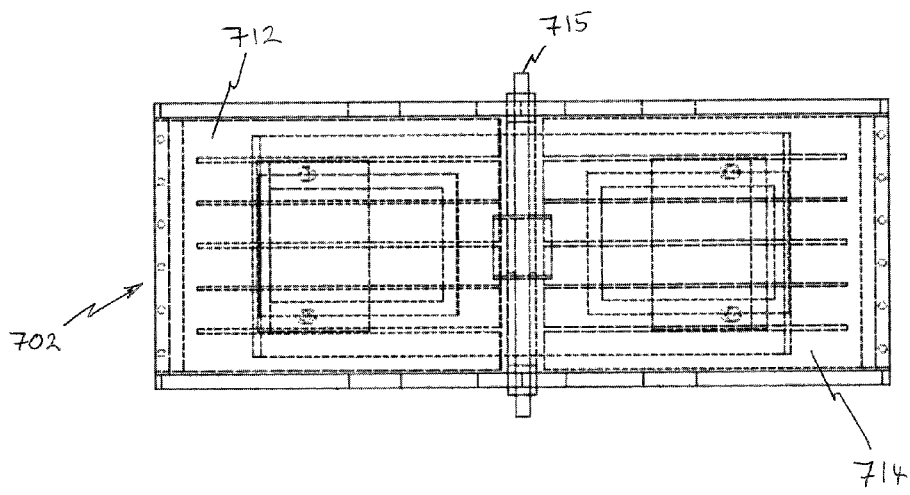
FIG. 7E
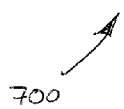

| PARAMETERS FOR ACTUATOR ALGORITHM | |
|---|---|
| Notes on Actuators: | |
| a) | Two actuators shown, actual design may include 1, 2 or many actuators. |
| b) | $f_1(...)$ is the relationship that determines the actuator area exposed to the sun ($A_{sun}$) as a function of the Tracking Error (design specific). |
| c) | $qdot_{in}$ = rate of heat input to the actuator, assumed to be purely radiation input |
| d) | $qdot_{out}$ = rate of heat lost from the actuator (inc. losses due to convection, conduction, & radiation. |
| e) | $qdot_{net}$ = rate of heat change of the actuator ( = rate input minus the rate of heat lost). |
| f) | $Q_t$ = integrated rate of heat change (= total heat added to the actuator as a function of time). |
| g) | The total heat added to the actuator divided by mass and specific heat of the material gives the change in temperature of the actuator. |
| h) | Adding change in temp. to initial temp. of actuator gives current actuator temp. |
| i) | $f_2(...)$ is the function that relates the temperature to the displacement of the actuator, determined by material properties and geometry. |
| j) | $Z_n$ = displacement output from the actuator at the point of force transmission. |
| k) | $F_1, F_2$ are forces output by actuators 1 and 2, respectively. |
| Notes on Force Transmission Mechanism: | |
| l) | $F_1, F_2...$ are input from thermal actuators to the force transmission mechanism |
| m) | Disturbance forces $F_{dis}$ are added to actuator forces |
| n) | Total force $F_{tot}$ must overcome transmission stiction for force to transmit. |
| o) | Stiffness of the transmission is the sum of actuator stiffnesses, $(k_1+k_2+...)$. |
| p) | Resultant displacement is determined by transmission stiffness. |
| q) | Displacement must exceed transmission backlash, for motion to occur. |
| r) | Disturbance forces may include steady/intermittent gusts of wind, force of gravity. |
| s) | Damping mechanisms may be included to resist sudden disturbances. |
| t) | Increasing actuator stiffness $k_1$ and $k_2$ reduces the effect of disturbance force $F_{dis}$. |

FIG. 12C

THERMAL-MECHANICAL POSITIONING FOR RADIATION TRACKING

CROSS-REFERENCE TO RELATED APPLICATIONS

This application claims priority to and the benefit of U.S. provisional patent application Ser. No. 61/174,278 filed Apr. 30, 2009, the disclosure of which is incorporated herein by reference in its entirety.

FIELD OF THE INVENTION

The present invention relates generally to the field of thermal radiation tracking and, more particularly, to combined thermo-mechanical systems, and related methods, that can be used to track a thermal radiation source for use in energy production systems utilizing solar power.

BACKGROUND OF THE INVENTION

The solar industry has experienced rapid growth in recent years as the levelized costs of electricity (LCOE) associated with the generation of energy through solar power systems has decreased to the point that it is approaching grid parity. As a result, electrical utilities have become increasingly interested in the development of solar power generation systems for incorporation into energy grids.

Approaches to utilizing solar power include the use of large scale solar power plants and distributed solar systems (e.g., distributed rooftop solar systems) where multiple rooftops in a housing development are covered by solar panels strung together to generate power. The use of distributed rooftop solar systems may be advantageous, for example, in reducing transmission losses by bringing energy production closer to the usage site. Such systems may also be beneficial in regions that lack the power transmission infrastructure necessary to utilize power generated from remote power plants. By distributing clusters of solar collectors over many locations, rather than in one centralized facility, distributed rooftop solar systems also reduce the effect of interference in solar power due to localized weather changes.

The power generated by solar elements (e.g., one or more solar panel or collector) in either a solar power facility or a distributed solar system may be increased by controlling the position and/or orientation of the solar element(s) with respect to the sun. More particularly, solar elements are generally more efficient when they are oriented to ensure that the solar radiation impinges on them at an angle perpendicular to the surface of the solar element. As such, by constantly reorienting the solar element to follow the path of the sun, so that solar radiation impinges upon the solar element(s) perpendicular to the surface of the solar element(s) over an extended period, the solar element(s) may exhibit substantially improved efficiency over the course of a day than is possible with stationary, fixed orientation, solar elements.

However, conventional approaches for providing solar elements that track the sun over the course of a day, or a portion thereof, often require "active" solar tracking systems utilizing electric motors, photonic sensors, and/or electrical circuitry to provide the logic and mechanisms for constantly reorienting the system. Such systems can be relatively expensive to manufacture and maintain, and may require access to a power grid, or require the use of a portion of the power generated by a solar element, in order to function, thereby reducing their efficiency. Such systems may also require regular maintenance, possibly requiring the replacement of expensive and complex parts, in order to function over extended periods. As a result, such active tracking systems are also generally expensive to manufacture and maintain, and provide limited utility in remote locations where, for example, regular maintenance and access to the materials needed for construction and maintenance is difficult.

Alternative approaches to solar tracking, utilizing "passive" solar tracking systems have been contemplated that do not require an electrical power source and a relatively complex electro-mechanical system to operate. However, these systems often rely upon actuation forces resultant from the buildup of pressure within sealed fluidic systems that contain liquids and gases and/or the reorientation of a displacing member due to forces of the earth's gravity acting upon a shifting center of mass in the displacing member itself. While such systems may provide some utility, they still require relatively complex mechanical systems and mechanisms that may increase the cost of manufacture and limit the utility of the systems in remote locations where access to regular maintenance and materials is limited.

SUMMARY OF THE INVENTION

There is therefore a need for a low cost, low maintenance, and high efficiency solar tracking system capable of tracking a radiation source (e.g., the sun) over extended periods (e.g., weeks, months, or even years) with little or no maintenance expense or time required.

As such, the present invention is directed towards novel methods and devices for providing passive (i.e., substantially or fully unpowered) solar tracking methods and devices where, for example, a force necessary to pivot and/or move a platform for a solar panel/collector is generated and applied by one or more thermally actuated elements. The thermally actuated elements may be utilized to reorient the platform to follow, or substantially follow, a path of a radiation source (e.g., the sun). Various embodiments of the invention include passive solar tracking methods and devices that can include various materials, structural elements, and/or force transfer mechanisms to produce the required reorientation of a platform for a solar panel to increase the efficiency of the solar panel.

One aspect of the invention relates to an apparatus for controlling an angular position of a pivotable platform relative to a radiation source. The apparatus includes a frame, a thermal actuation element coupled to the frame, and a pivotable platform positioned at least partially between the radiation source and the thermal actuation element, so as to at least partially block energy from the radiation source from impinging on the thermal actuation element. The apparatus also includes apparatus for pivoting the pivotable platform in response to a thermally controlled deformation of the thermal actuation element.

The thermal actuation element may be adapted to pivot the pivotable platform to substantially track a movement of the radiation source. In one embodiment, a surface area of the thermal actuation element that the pivotable platform blocks from the radiation source is dependent upon at least one of a position of the radiation source and an angle of the pivotable platform. The thermal actuation element may be coupled at a distal end to the apparatus for pivoting the pivotable platform, and/or coupled at a proximal end to the frame by a mounting structure. The mounting structure may include a material having a lower thermal conductivity than the thermal actuation element.

The thermal actuation element may include, or consist essentially of, a bimetallic element. The bimetallic element may be a substantially elongate longitudinally extending element. In one embodiment, the bimetallic element includes a plurality of leaves held together by one or more clamping and/or fastening mechanisms that maintain physical contact between adjacent leaves during the thermally driven deformation of the bimetallic element. The clamping and/or fastening mechanism may permit adjacent leaves to slide substantially freely against one another in a longitudinal direction while remaining in physical contact. At least one surface of at least one of the plurality of leaves may be coated with a lubricant. In one embodiment, each surface of the leaves in contact with a surface of an adjoining leaf is coated with a lubricant.

In one embodiment, a response time of the thermally controlled deformation is controlled by a control element including, or consisting essentially of, at least one of a thermal mass of the thermal actuation element, a thermal resistance between adjacent thermal masses in the thermal actuation element, a heat pipe, an external thermal mass, and/or combinations thereof.

The apparatus may include a plurality of thermal actuation elements. At least two of these thermal actuation elements may be arranged in parallel. In one embodiment, two thermal actuation elements are arranged substantially symmetrically about a pivot axis of the pivotable platform. The pivotable platform, and/or one or more thermal actuation elements, may include at least one of a radiation absorbing and/or reflecting material and/or at least one textured surface adapted to reduce radiation reflection.

The thermal actuation element may include two separate elongate, longitudinally extending elements coupled at a proximal end to the frame, at least one of the elongate/longitudinal elements adapted for at least one of temperature induced linear expansion and/or temperature induced bending. The two elongate/longitudinal elements may be coupled to the apparatus for pivoting the pivotable platform through, for example, a hinge element. The apparatus for pivoting the pivotable platform may include, or consist essentially of, at least one gear, rod, cable, chain, pivoting shaft, cam, and/or combinations thereof. In one embodiment, a cable is connected to at least one thermal actuation element and wrapped around a pivotable shaft coupled to the pivotable platform. The cable may be coupled to a cam.

One embodiment of the invention includes apparatus for controlling convective heat loss from the thermal actuation element. The apparatus for controlling convective heat loss may include, or consist essentially of, an enclosure adapted to permit the transmission of energy from the radiation source to the thermal actuation element, while controlling air flow proximate the thermal actuation element. The enclosure may include one or more shutters adapted to control air flow proximate the thermal actuation element. The apparatus may include apparatus for dampening disturbances to the pivotable platform including, but not limited to, one or more wind shields, airfoils, wind activated braking mechanisms, dashpots, shock absorbers, and/or combinations thereof.

Another aspect of the invention includes a system for controlling the angular position of a pivotable platform relative to a radiation source. The system includes a frame, a platform pivotably coupled to the frame, and a thermal actuation element coupled to the frame and adapted to pivot the platform to substantially track a movement of the radiation source, wherein the pivotable platform is adapted to at least partially block energy from the radiation source from impinging on the thermal actuation element.

Yet another aspect of the invention includes a method of tracking a radiation source. The method includes the steps of providing a pivotable platform, positioning a thermal actuation element below the pivotable platform so that the pivotable platform at least partially blocks energy from the radiation source from impinging on the thermal actuation element, and coupling the thermal actuation element to the pivotable platform, thereby allowing the pivotable platform to pivot in response to a thermally controlled deformation of the thermal actuation element.

In one embodiment, the thermal actuation element is adapted to pivot the pivotable platform to substantially track a movement of the radiation source. A surface area of the thermal actuation element that the pivotable platform blocks from the radiation source may be dependent upon at least one of a position of the radiation source and/or an angle of the pivotable platform. The thermal actuation element may include one or more bimetallic elements.

The method may include controlling a response time of the thermally controlled deformation through use of one or more control elements such as, but not limited to, at least one of a thermal mass of the thermal actuation element, a thermal resistance between adjacent thermal masses in the thermal actuation element, a heat pipe, an external thermal mass, and/or combinations thereof.

The method may include the step of positioning a plurality of thermal actuation elements below the pivotable platform. At least two of the plurality of thermal actuation elements may be arranged in parallel and/or be arranged substantially symmetrically about a pivot axis of the pivotable platform. The thermal actuation element may include, or consist essentially of, two separate elongate, longitudinally extending elements coupled at a proximal end to the frame, at least one of the elongate/longitudinal elements adapted for at least one of temperature induced linear expansion and/or temperature induced bending. The two elongate/longitudinal elements may be coupled to the apparatus for pivoting the pivotable platform through a hinge element. In one embodiment, the thermal actuation element is coupled to the pivotable platform through an element such as, but not limited to, at least one gear, rod, cable, chain, pivoting shaft, cam, and/or combinations thereof.

The method may also include controlling convective heat loss from the thermal actuation element, for example through use of an enclosure adapted to permit the transmission of energy from the radiation source to the actuation element, while controlling air flow proximate the thermal actuation element. The enclosure may include one or more shutters adapted to control air flow proximate the thermal actuation element. The method may include dampening disturbances to the pivotable platform, for example through use of a dampening system such as, but not limited to, a wind shield, an airfoil, a wind activated braking mechanism, a dashpot, a shock absorber, and/or multiples and combinations thereof.

Another aspect of the invention includes an apparatus for controlling angular position of a pivotable platform relative to a radiation source. The apparatus includes a frame, one or more elongate, longitudinally extending thermal actuation elements coupled to the frame, a shading platform positioned at least partially between the radiation source and the thermal actuation element, the shading platform including a plurality of shading elements adapted to at least partially block energy from the radiation source from impinging on the thermal actuation element, a pivotable platform, and apparatus for pivoting the pivotable platform in response to a thermally controlled deformation of the thermal actuation element.

The shading platform may be substantially stationary or may pivot in response to a thermally controlled deformation of the thermal actuation element. In one embodiment, the shading elements comprise shutters fixedly coupled to the shading platform. The shutters may be arranged symmetrically about a pivot axis of the pivotable platform.

Yet another aspect of the invention includes a system for controlling the angular position of a pivotable platform relative to a radiation source. The system includes a frame, a first platform pivotably coupled to the frame, one or more elongate, longitudinally extending thermal actuation elements coupled to the frame, and a shading platform positioned at least partially between the radiation source and the thermal actuation element. The shading platform includes a plurality of shading elements adapted to at least partially block energy from the radiation source from impinging on the thermal actuation element, the thermal actuation element adapted to pivot the first platform in response to impingement of energy from the radiation source thereon to substantially track a movement of the radiation source.

Yet another aspect of the invention includes a method of tracking a radiation source. The method includes the steps of providing a shading platform including a plurality of shading elements, positioning one or more elongate, longitudinally extending thermal actuation elements below the shading platform so that the shading platform at least partially blocks energy from the radiation source from impinging on the thermal actuation element, and coupling the thermal actuation element to a pivotable platform, thereby allowing the pivotable platform to pivot in response to a thermally controlled deformation of the thermal actuation element.

These and other objects, along with certain advantages and features of the present invention herein disclosed, will become more apparent through reference to the following description, the accompanying drawings, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which:

FIG. 2A is a schematic side view of another solar tracking system with the solar radiation source directly above the system, in accordance with one embodiment of the invention;

FIG. 2B is a schematic side view of the solar tracking system of FIG. 2A, with the solar radiation source oriented at an angle to the system;

FIG. 3A is a schematic side view of another solar tracking system with the solar radiation source directly above the system, in accordance with one embodiment of the invention;

FIG. 3B is a schematic side view of the solar tracking system of FIG. 3A, with the solar radiation source oriented at an angle to the system;

FIG. 4A is a schematic side view of yet another solar tracking system with the solar radiation source directly above the system, in accordance with one embodiment of the invention;

FIG. 4B is a schematic side view of the solar tracking system of FIG. 4A, with the solar radiation source oriented at an angle to the system;

FIG. 7C is a schematic end view of the solar tracking system of FIG. 7A;

FIG. 7D is a schematic sectional side view of the solar tracking system of FIG. 7C taken along section B-B;

FIG. 7E is a schematic plan view of the solar tracking system of FIG. 7A;

FIG. 12C is a table of parameters for the control algorithm of FIGS. 12A and 12B.

DETAILED DESCRIPTION OF THE INVENTION

Figures 1A, 1B:
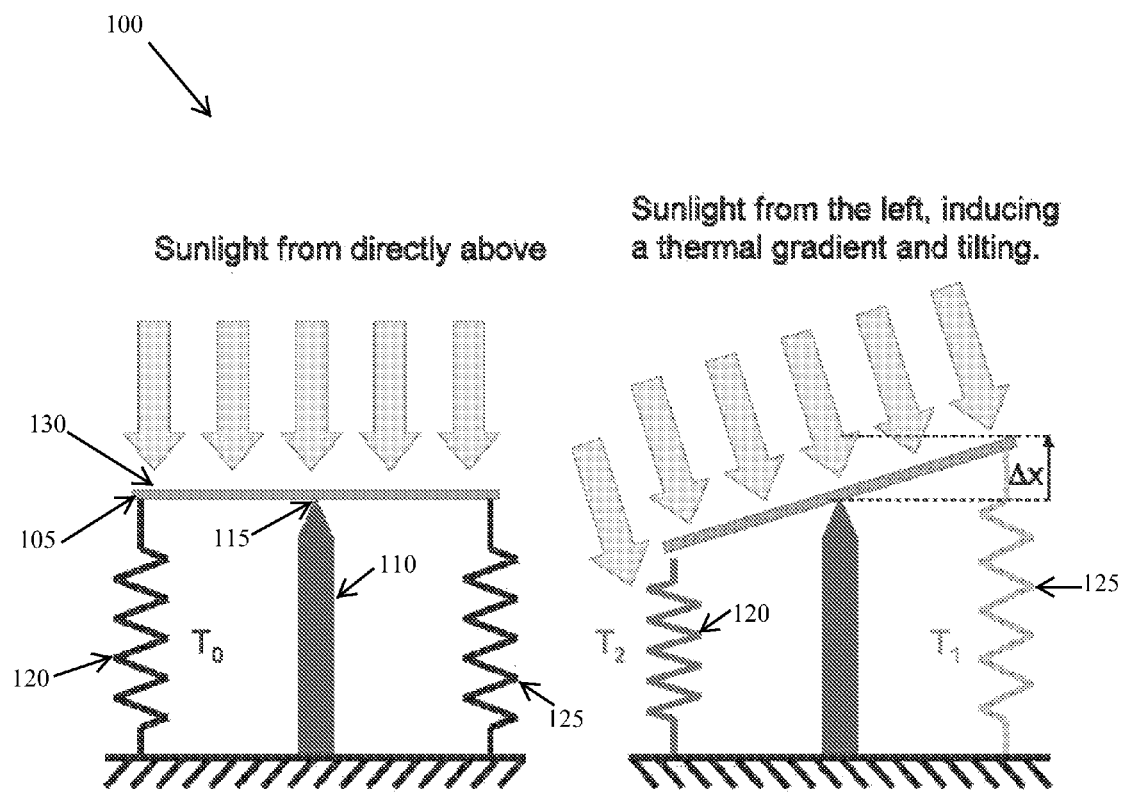
FIG. 1A is a schematic side view of an example solar tracking system with the solar radiation source directly above the system, in accordance with one embodiment of the invention.
FIG. 1B is a schematic side view of the solar tracking system of FIG. 1A, with the solar radiation source oriented at an angle to the system.

Various embodiments of the present invention provide for the tracking of a radiation source (e.g., the sun) utilizing a system for controlling the position and/or orientation of one or more solar panels, photovoltaic modules, collectors, and/or reflectors without the need for electric motors, photonic sensors, and/or electrical circuitry. In alternative embodiments, any appropriate solar element, measurement device, tracking device, and/or combination thereof, may be utilized with the tracking systems and methods described herein. In some instances, certain conventional powered elements and controls may be utilized in combination with the passive systems described herein, to achieve a combined benefit, albeit at much lower power consumption levels than would be attainable without the addition of the passive system components.

In contrast to systems requiring electrically powered actuation for tracking, the passive systems and methods described herein utilize one or more elastically deformable thermal actuators designed to change shape and/or orientation in response to variations in temperature due to solar irradiation and heating. The elastic deformation of the thermal actuators may be controlled, for example, by controlling the amount of solar energy impinging upon a thermal actuator through the controlled shading of the thermal actuators in response to variations in the elevation, azimuth, and/or intensity of the radiation/sunlight reaching the device. Since the thermal actuators do not require any electrical energy input to change position or orientation, the systems and methods described herein provide simple, stable devices for improving the efficiency of solar power generation from a solar panel or collector, without the need for active control through the use of powered electronic components. As a result, the passive solar tracking techniques described herein provide cheaper, simpler solar tracking systems that can be utilized, for example, in remote regions where access to a power grid, materials, and related technology necessary to power, control, and maintain active control systems is limited. Arrays of solar tracking systems can be used in large scale solar power plants or in distributed solar systems.

One embodiment of the invention includes a solar tracking system with a driving mechanism including, or consisting essentially of, one or more thermal actuators. The solar actuators are heated by sunlight, each actuator being designed to output a specific amount of force and displacement as a function of temperature to produce a moment on a pivotable support platform for a solar element (e.g., a solar panel or solar collector). The angular orientation of the platform is related to the temperature of the thermal actuators over the course of a day, with variations in temperature producing variations in forces, displacements, and/or moments acting on the system to reorient the platform, thereby allowing it to track the movement of the sun. More particularly, in one embodiment, when a portion of the system is exposed to direct sunlight, its steady state temperature is determined as a balance of heat input into, and output from, the system, where heat is input into the system via absorption of direct solar radiation by the system. Heat is output from the system, for example, via conduction through the system and into the surrounding ambient environment, convection at the surface of the system into the surrounding air, and/or black-body radiation from the surface of the system.

Since various embodiments of the invention relate to solar tracking devices, the systems may be configured such that the force-displacement output from the one or more thermal actuators is sensitive to, and controlled by, the position of the sun in the sky. This may be achieved by introducing a shading element that varies the area of each actuator exposed to sunlight over time in relation to the angle of the solar radiation striking the system. The shading element may include, or consist essentially of, at least a portion of the pivotable platform on which the solar panels/collectors are held. In an alternative embodiment, a separate pivotable shading element (i.e., separate from the pivotable platform) may be utilized, in addition to, or in place of, the pivotable platform, to provide the necessary shading.

The amount of force and displacement generated by each thermal actuator as a function of temperature is dependent upon elements such as, but not limited to, the physical parameters of the thermal actuators (e.g., length, width, thickness, mass, stiffness, etc), the material or materials used, and the coupling system for converting the force/displacement of the thermal actuator into a moment for producing an angular displacement of the platform. In general, force may be applied to the platform via a force transmission mechanism that translates force output from the one or more thermal actuators (e.g., resultant from approximate linear displacement of one or more bimetallic strips) to reorient the platform (e.g., through rotation of the platform about a pivoting axis). The force transmission mechanism may include gears, rods, cables, chains, pivoting shafts, cams, and/or combinations thereof. For example, one embodiment of the invention utilizes a cable that is connected to a distal end of each thermal actuator (i.e., a non-anchored, free end of the thermal actuator) and is wrapped about a pivoting shaft coupled to the platform.

In one embodiment, the thermal actuators are adapted to generate a sufficiently high output force to pivot the platform through a required pivot angle and stably hold the platform at that pivot angle. In addition, the thermal actuators may provide a force sufficient to compensate for environmental disturbance forces that may be present (e.g., from wind acting on the system), and overcome any stiction and/or backlash that may be present within the force transmission mechanism (where stiction and backlash are respectively the minimum force and displacement required at the input of a force transmission mechanism for any force or displacement to be transmitted to its output). Stiction may be generated, for example, in one or more bearings that permit the shaft to pivot, and/or in a cable that acts upon the shaft. In one embodiment, backlash, generated, for example, as a result of slack in a cable connection between a thermal actuator and a pivot shaft, is compensated for by ensuring that the thermal actuators can be displaced by a distance that is greater than any backlash in the transmission mechanism. The extent to which actuator force and displacement can be increased above levels of stiction and backlash in the transmission relate to a signal to noise ratio of the thermo-mechanical control system.

In one embodiment, actuator force (F) and displacement (Z) of a thermal actuator are linearly related to one another by a constant value of actuator stiffness (k) for a linear elastic system (F=kZ), as is the case for sufficiently small deflection of a bimetallic thermal actuator. Thus, an increase in force output by an actuator can be achieved by increasing stiffness at a given level of displacement, or vice versa. Stiffness and temperature coefficients of displacement of a thermal actuator are related to the material composition and geometry (e.g., through choice of materials and beam length, width and thickness, in the case of a bimetallic beam).

A schematic representation of a passive solar tracking system is shown in FIGS. 1A and 1B. In this embodiment, the solar tracking system 100 includes a support/shading platform 105 that is pivotably coupled to a frame 110 and which can pivot about a pivot axis 115 located at or about the center of mass of the platform 105. A first thermal actuation element 120 is coupled to a first side of the platform 105 (i.e., at any point on one side of the pivot axis 115), with a second thermal actuation element 125 coupled to a second side of the platform 105 (i.e., at any point on the other side of the pivot axis 115). The platform 105 and thermal actuation element (120, 125) may be of any appropriate size and shape. For example, the platform 105 may be configured to support a solar element (e.g. a photovoltaic solar panel) having dimensions including a length and/or width of up to 6 meters, or more. In one embodiment, various platforms 105 may support photovoltaic solar panels having a length and width up to, but not limited to, about 2 meters by 1 meter, 2 meters by 2 meters, or up to 6 meters by 3 meters, or more. In general, the solar elements supported by the platform may have any appropriate length to width aspect ratio. For example, various platforms 105 may support photovoltaic solar panels having a length to width ratio of about one to one or two to one.

The angular displacement of the platform 105 may be controlled by one or more thermal actuation elements of any appropriate length, width, thickness, and mass. For example, various thermal actuation elements may have a length up to about 2.5 meters, or more, a width up to about 0.5 meters, or more, and/or a thickness of up to about 1.5 centimeters, or more. The thermal actuation elements may have any appropriate length to width aspect ratio. For example, various thermal actuation elements may support photovoltaic solar panels having a length to width ratio of between about one to one up to a ratio of about six to one. An example thermal actuation element, for controlling the angular displacement of a photovoltaic solar panel having a length of 6 meters and a width of 3 meters, may have a length of about 2.44 meters, a width of about 0.41 meters, and a thickness of about 1.27 centimeters.

In alternative embodiments, the system 100 may be scaled to fit solar elements, measurement devices, and/or tracking devices having and appropriate length, width, thickness, and/or mass. For example, the systems and methods describes herein may be used in micro-scale systems carrying a photovoltaic element having dimensions including a length and/or width as small as about 20 microns, or less. For example, one embodiment of the invention may include a platform 105 adapted to support a photovoltaic solar panel having a length and width of about 300 microns and about 20 microns respectively. An example thermal actuation element, for controlling the angular displacement of a photovoltaic solar panel having a length of 300 microns and a width of 20 microns, may have a length of about 100 microns, a width of about 10 microns, and a thickness of about 0.1 microns.

An example system 100, in accordance with one embodiment of the invention, includes a platform 105 for supporting a 300 W photovoltaic solar panel having length of about 2 meters, a width of about 1 meter, and having thermal actuation elements having a length of about 0.6 meters, a width of about 0.1 meters, and a thickness of 0.127 centimeters. In various embodiments, the solar elements (e.g., photovoltaic solar panels) may be coupled to the platform 105 through any appropriate coupling elements and methods, including clamping and/or fastening elements, magnetic elements, adhesive elements, and/or combinations thereof. In one embodiment, the platform 105 is configured to support a single solar element. In an alternative embodiment, a single platform 105 may be configured to support a plurality of solar elements.

The first thermal actuation element 120 and second thermal actuation element 125 are adapted to deform in response to a change in temperature. This deformation may include a linear expansion and contraction, and/or a variation in curvature as the temperature of the thermal actuation element is increased and decreased. In the embodiment of FIG. 1A and FIG. 1B, the first thermal actuation element 120 and second thermal actuation element 125 each comprise a material, or materials, that generate a force on the platform 105, the force from each thermal actuation element producing a moment that pivots the platform 105 about the pivot axis 115 in response to a relative change in the temperature of each thermal actuation element. This may be achieved, for example, by selecting one or more materials that linearly expand in response to a decrease in temperature, and a linearly contract in response to an increase in temperature. In an alternative embodiment, thermal actuation elements that linearly expand in response to an increase in temperature, and a linearly contract in response to a decrease in temperature, may be utilized. Alternatively, the required force may be achieved by utilizing either substantially elongate, longitudinally extending bimetallic thermal actuation elements or substantially spiraling bimetallic thermal actuation elements that increase or decrease in curvature upon a change in temperature.

In operation, when a radiation source, such as the sun, is directly above the platform 105 (i.e., where angle $\alpha=0$), the platform provides a shading surface that blocks at least a portion of the solar radiation from impinging upon each of the first thermal actuation element 120 and second thermal actuation element 125 to the same extent, as shown in FIG. 1A. As a result, the first thermal actuation element 120 and second thermal actuation element 125 will be maintained at substantially the same temperature, thereby generating a substantially equal and opposite force on the platform 105 and thus holding the platform in a substantially flat position (i.e., where $\beta=0$) with the upper surface 130 of the platform 105 oriented substantially perpendicular to the source of radiation.

However, if the radiation source moves, the radiation will be directed towards the system 100 at an angle, the angle ($\alpha$) being dependent upon the specific position of the radiation source with respect to the system 100. As a result, as shown in FIG. 1B, the radiation will impinge more directly on one of the thermal actuation elements (in this case the first thermal actuation element 120), while the platform 105 will block a greater amount of the radiation from impinging on the other thermal actuation element (in this case, the second thermal actuation element 125). As a result, the temperature of the thermal actuation element more exposed to the solar radiation will be increased, while the temperature of the thermal actuation element blocked from the solar radiation by the platform 105 will remain the same or will be decreased. The resulting relative deformations of each of the thermal actuation elements generates a moment that produces an angular displacement of the platform 105, pivoting the platform 105 towards the radiation source and holding the platform 105 stably in that pivoted position.

The resulting angle $\beta$ of the platform 105 (to a horizontal plane) is dependent upon the deformation of each of the first thermal actuation element 120 and second thermal actuation element 125, which is, in turn, related to the relative temperature of each actuation element. The temperature of the thermal actuation elements (120, 125) is, in turn, related to the amount of solar radiation impinging upon them. As the amount of solar radiation impinging upon a thermal actuation element is related to the position of the source of solar radiation (i.e., the sun) with respect to the platform 105, an increase in the angle ($\alpha$) of the solar radiation to the vertical will result in an increase in the angle ($\beta$) of the platform 105 to the horizontal. As a result, by selecting the geometry, material(s), and configuration of the thermal actuation elements (120, 125), and related coupling to the platform 105, to provide an appropriate pivoting force for a given solar radiation angle, the system 100 is capable of tracking the sun through a large range of angles, with the angle of the platform 105 oriented such that the upper surface 130 of the platform 105 is perpendicular, or substantially perpendicular, to the solar radiation source within its range of adjustment, regardless of its position with respect to the platform 105. More particularly, through appropriate selection of the material(s), geometry, mass, position, orientation, and/or configuration of the thermal actuation elements and coupling, the system 100 can be configured such that the angle ($\alpha$) of the solar radiation to the vertical is substantially equal to the angle ($\beta$) of the platform 105 to the horizontal over a large range of solar radiation source positions with respect to the platform 105 (i.e., $\alpha=\beta$).

In one embodiment, the angle $\alpha$ may be substantially identical to the angle $\beta$ for a range of angles from $-60°\leq\alpha\leq60°$. In alternative embodiments, the angle $\alpha$ may be substantially identical to the angle $\beta$ for a range of angles from $-45°\leq\alpha\leq45°$, $-30°\leq\alpha\leq30°$, $-15°\leq\alpha\leq15°$, or any appropriate ranges therebetween. In one embodiment, the system 100 is adapted to pivot symmetrically through a range of angles in both the positive and negative directions. In an alternative embodiment, the range of angles through which the platform may pivotably track the sun is non-symmetric.

As each thermal actuation element deforms with temperature in the same manner, or substantially the same manner, the platform 105 may be pivoted in either a clockwise or anticlockwise direction about the pivot axis 115. Further, as the temperature of each of the first thermal actuation element 120 and second thermal actuation element 125 is substantially identical when the source of radiation is absent (e.g., at night), the platform 105 will return to its substantially horizontal orientation at night. When the radiation source returns (e.g., at sunrise), the platform 105 will again tilt towards the radiation source, and can therefore repeatedly track the path of the sun from morning through evening on a daily basis.

In one embodiment, the system 100 can be utilized to improve the efficiency of a solar driven energy generation device (e.g., a solar panel or collector). In this embodiment, one or more solar panels and/or collectors are placed on the upper surface 130 of the platform 105. The system 100 is then positioned such that the pivot axis 115 is substantially perpendicular to the path traversed by the sun over the course of a day. During nighttime, the temperature of each of the first thermal actuation element 120 and second thermal actuation element 125 will be substantially the same, and the platform 105 will be oriented substantially horizontally (i.e., where $\beta=0$). Upon sunrise, the solar radiation will preferentially heat the thermal actuation element nearest to it (with solar radiation being at least partially blocked from impinging upon the thermal actuation element further from the sun by the platform 105), thereby deforming the thermal actuation elements, which in turn produces a moment that pivots the platform 105, with the solar panels thereon, towards the sun. As the sun traverses the sky over the course of a day, the relative heating of each of the thermal actuation elements will change as the angle $\alpha$ changes. As a result, the deformation of each thermal actuation element will vary, thereby pivoting the platform 105 at the same rate, or substantially the same rate, as the change in the angle $\alpha$. As a result, the platform 105 can be pivoted to remain perpendicular to the angle ($\alpha$) of the solar radiation over the course of the day, thereby significantly increasing the efficiency of the solar panel or collector over stationary, non-pivotable, panels or collectors.

If the solar radiation is blocked, or at least partially blocked, by, for example, adverse weather conditions (e.g., clouds), the difference in amount of solar radiation impinging on the thermal actuation element closest to the sun will be reduced, and the platform 105 may begin to at least partially pivot back towards its default position (where $\beta=0$). However, once the obstruction to the solar radiation has cleared, the thermal actuation element nearest the sun will again be heated to a greater extent than the thermal actuation element further away from the sun (i.e., the thermal actuation element at least partially blocked from solar radiation by the platform 105), and the platform 105 will be preferentially pivoted towards the sun. As such, the system 100 provides an automatic tracking system that will preferentially point the platform 105 towards a source of solar radiation without any need for active control and power, and without the need for any calibration, control, or maintenance from a user. In one embodiment, the thermal actuation element may be highly thermally insulating or of relatively large thermal capacitance, thereby storing sufficient heat when impinged upon by solar radiation to minimize the change in orientation of the platform 105 if a cloud fleetingly passes overhead.

In one embodiment, at least a portion of the platform 105, such as, but not limited to, the sides and underside of the platform 105) may be coated, or otherwise covered, by at least one radiation absorbing or reflecting material (e.g., a radiation absorbing black paint, a powder coat, and/or an epoxy/polymer). The sides and/or underside of the platform 105, or portions thereof, may also be coated, or otherwise covered, in at least one textured surface adapted to reduce radiation reflection. Such radiation absorbing elements may be useful, for example, in reducing reflections from the underside of the platform 205 that could heat the shaded thermal actuation element, thereby reducing the temperature difference between the thermal actuation elements and producing a spurious angular displacement of the platform 105. In one embodiment, thermal actuation elements, or portions thereof, may be coated, or otherwise covered, by at least one radiation absorbing or reflecting material (e.g., a radiation absorbing black paint, a powder coat, and/or an epoxy/polymer) and/or a textured surface adapted to reduce radiation reflection, in order to increase energy absorption from the solar radiation source.

In an alternative embodiment, the system 100 may require only one of the first thermal actuation element 120 or second thermal actuation element 125 to operate. Here, the thermal actuation element is coupled to the platform 105 such that it holds the platform 105 in a substantially horizontal position (i.e., where $\beta=0$) when the sun is directly above the platform 105 (i.e., when $\alpha=0$). The thermal actuation element then pivots the platform 105 to one side when the solar radiation impinges on it as the sun moves to the same side of the pivot axis 115 as the thermal actuation element, and pivots the platform 105 to the other side when the solar radiation is blocked, or partially blocked, by the platform 105 as the sun moves to the opposite side of the pivot axis 115 from the thermal actuation element. As a result, for certain configurations, where a single thermal actuation element can generate a sufficient force and/or moment to pivot the platform 105 through a sufficient angle to track a radiation source, a single thermal actuation element may be utilized.

In should be noted, however, that systems that utilize only a single thermal actuator for pivotably orienting a solar panel, based on such a variable amount of shade, may be sensitive to variation in ambient temperature of the environment. As a result, such single actuator systems may produce different orientation angles of a platform over time on relatively hot or cold days. By utilizing a plurality of thermal actuators, such environmental sensitivities may be avoided. For example, embodiments including two thermal actuators that each receive a different amount of solar radiation (based on sun position and the resultant shading of each actuator by the platform), but are both exposed to the same ambient environment and the same sources of heat loss, can control the orientation of a platform in relation to the position of sun in the sky without being subject to ambient temperature sensitivity, as any deformation in one thermal actuator due to a change in the ambient temperature is compensated for by an equal and opposite deformation of the other thermal actuator.

Various configurations of thermal actuation element may be utilized with the systems and methods described herein. For example, thermal actuation elements may be formed as sheets or rods of one or more materials that linearly expand and contract in response to a change in temperature. Other appropriate thermal actuation elements may be formed as substantially elongate/longitudinal, or substantially spiraling, bimetallic sheets or rods, with these bimetallic elements elastically increasing and decreasing in curvature in response to a change in temperature. Other thermal actuation elements, including, for example, containers filed with one or more fluids that expand and contract in response to a change in temperature, may also be utilized in the systems and methods described herein.

In addition, various coupling mechanisms may be utilized for pivoting the platform 105 in response to a thermally induced deformation of the thermal actuation elements (120, 125). For example, one embodiment of the invention includes one or more cables having distal ends attached to a portion of each thermal actuation element (120, 125) that undergoes deformation, with a central portion of the cable wound around a pivoting shaft coupled to the platform 105 and centered about the pivot axis 115. As a result, relative movement of each thermal actuation element (120, 125), in response to a temperature change, produces a pulling force on the cable(s), with the wound portion of the cable(s) thereby frictionally engaging the pivoting shaft to produce a moment thereon. In one embodiment, the pivoting shaft may include a knurled, ribbed, or otherwise roughened portion engaging the wound cable(s) to increase the friction engagement therebetween. In an alternative embodiment, one or more cables, or portions thereof, may be replaced by a linked chain that engages with a toothed gear portion of the pivoting shaft, thereby preventing slippage and ensuring a consistently repeatable force transfer between the chain and pivoting shaft.

Another embodiment of the invention may include one or more rods attached to a deforming portion of a thermal actuation element and engaging with one or more gears coupled with, or integral with, a pivoting shaft. The rod may, for example, have a toothed portion (e.g., forming a rack) adapted to engage with teeth on one or more of the gears (e.g., a pinion gear) to prevent slippage and ensure a consistently repeatable force transfer between the rod and gear(s). Alternative embodiments may include the use of pivot arms, cam shafts, springs, magnetic driving elements, pneumatic elements, and/or hydraulic elements, which may be configured in any appropriate arrangement to ensure the production of an appropriate moment on a pivoting shaft in response to a displacement and/or force applied by the thermal actuation elements.

One embodiment of the invention includes the utilization of one or more bimetallic strips or sheets for use as thermal actuation elements for controlling the orientation of a pivotable platform (e.g., a single axis pivotable platform) for a solar energy generation system such as, but not limited to, photovoltaic solar panels (e.g., including one or more photovoltaic cells) and/or concentrating or non-concentrating solar collectors. An example system 200 including two bimetallic elongate, longitudinally extending, thermal actuation elements (220, 225) is shown in FIGS. 2A and 2B.

In this embodiment, the thermal actuation elements (220, 225) are coupled at their respective proximal ends (235, 240) to a frame 210. The frame 210 includes a central support column 235 on which a platform 205 is pivotably supported. The platform 205 includes a central pivoting shaft 215 which is pivotably mounted to the central support column 235. A cable 250 is attached to the respective distal ends (255, 260) of the thermal actuation elements (220, 225), with a central portion of the cable wound around the pivoting shaft 215 of the platform 205. The platform 205 supports a photovoltaic module 265 for generating electrical energy from solar radiation impinging thereon. In one embodiment, the frame 210 is made from a material having a lower thermal conductivity than the bimetallic thermal actuation elements (220, 225)

The bimetallic thermal actuation elements (220, 225) include a bi-layer structure formed from two materials that expand and contract at different rates in response to a change in temperature. Example materials for the two layers of the bimetallic strip include, but are not limited to, metals such as gold, silver, titanium, tungsten, silicon, molybdenum, nickel, chromium, iron, manganese, brass, copper, steel, steel alloys, aluminum, and/or combinations thereof. Alternatively, or in addition, various rubbers, plastics, and/or ceramics may be used for one or more materials of the bimetallic elements.

The materials and structure of the bimetallic elements can be selected to produce bimetallic structures having any appropriate properties. For example, one bimetallic structure, formed from materials such as nickel, chromium, and/or iron, can have a specific curvature of about 27 $(10^{-6}/K)$+/−5%, an operational temperature range of between about −18° C. and 149° C., and a Young's modulus of about 17.2 GPa. Another example bimetallic structure, formed from materials such as nickel, chromium, and/or manganese, can have a specific curvature of about 38.7 $(10^{-6}/K)$+/−5%, an operational temperature range of between about −18° C. and 204° C., and a Young's modulus of about 13.8 GPa. Yet another example bimetallic structure, formed from materials such as nickel, manganese, copper and/or iron, can have a specific curvature of about 39 $(10^{-6}/K)$+/−5%, and an operational temperature range of between about −20° C. and 200° C.

In general, bimetallic strips are designed to convert a temperature change into a mechanical displacement through deformation of the strip upon a change in the temperature of the strip. The strips are formed from two layers of material, each layer having a different coefficient of thermal expansion, with the two layers attached along their length through, for example, bonding, riveting, brazing, cladding, and/or welding. In operation, the different expansion rates of the two materials force the flat strip to bend elastically in a first direction when heated above its initial temperature, and in an opposite, second, direction when cooled below its initial temperature. The metal with the higher coefficient of thermal expansion will be on the outer side of the curve when the strip is heated, and on the inner side when cooled. The bimetallic strip can be configured to be initially flat, or to have a predetermined curvature prior to heating or cooling. In various embodiments, the bimetallic strip can be configured to have its un-deformed, substantially flat, configuration at any appropriate temperature.

The system is configured such that, when the solar radiation is directly above the platform 205, as shown in FIG. 2A, the bimetallic thermal actuation elements (220, 225) provide an equal and opposite force that holds the platform 205 stable in a substantially horizontal orientation (i.e., where $\beta$=0). However, if the solar radiation impinges upon the system 200 at an angle ($\alpha$), the solar radiation will preferentially heat one of the bimetallic thermal actuation elements (220, 225), thereby producing a deformation of the bimetallic thermal actuation elements (220, 225) which, in turn, pivots the platform 205 toward the source of the solar radiation. Note that the figures are schematic in nature, and in various embodiments the central pivoting shaft 215 may be further from the bimetallic thermal actuation elements (220, 225), and/or the bimetallic thermal actuation elements (220, 225) may extend out further from the platform 205, to allow a greater portion of the bimetallic thermal actuation elements (220, 225) to be directly impinged upon by solar radiation at a given angle $\alpha$.

In FIG. 2B, the solar radiation preferentially impinges upon bimetallic thermal actuation element 225, thereby heating that element. Simultaneously, the platform 205 blocks the solar radiation, or at least a portion thereof, from impinging on bimetallic thermal actuation element 220, thereby cooling that element or at least maintaining that element at the ambient temperature. As a result, the two bimetallic thermal actuation elements (220, 225) deform in opposite directions. As the distal ends (255, 260) of the bimetallic thermal actuation elements (220, 225) are coupled to the cable 250, the deformation of the bimetallic thermal actuation elements (220, 225) results in the cable 250 being pulled down by the distal end 260 of bimetallic thermal actuation element 225, thereby inducing a moment in the pivoting shaft 215 which radially displaces the platform 205. The angle of pivot ($\beta$) of the platform 205 can be calibrated such that, over a range of impingement angles (e.g., from $-30° \leq \alpha \leq 30°$, for any given impingement angle ($\alpha$) of the solar radiation $\beta$ is equal to, or substantially equal to, $\alpha$. Note that, if the solar radiation is directed towards the system 200 from the opposite side, the platform 205 will pivot to that side in the same manner as described above. The platform may be of any appropriate length and width with respect to the thermal actuation elements (220, 225), and be mounted at any appropriate height above the thermal actuation elements (220, 225), to allow shading of any required portion of the thermal actuation elements (220, 225) for a specific pivot angle.

In one embodiment, a plurality of cables 250 are coupled to the bimetallic thermal actuation elements (220, 225) at regular, or irregular, intervals across its width. In an alternative embodiment, only a single cable 250 is used. The cable may be manufactured from any appropriate material such as, but not limited to, a metal such as steel, a metal alloy, a fabric, a polymer, and/or combinations thereof.

In one embodiment, the cable 250 is coupled to the bimetallic thermal actuation elements (220, 225) at or near the distal ends (255, 260). In an alternative embodiment, both the proximal ends (235, 240) and distal ends (255, 260) of one or more of the bimetallic thermal actuation elements (220, 225) may be fixedly coupled to the frame 210, with the bimetallic thermal actuation elements (220, 225) bowing in their central regions upon a change in temperature, and with the cable 250 coupled to the bimetallic thermal actuation elements (220, 225) at their central regions. In one embodiment, the location at which the cable 250 is coupled to the bimetallic thermal actuation elements (220, 225) may be adjustable, for example by providing multiple connection points or a variably adjustable connection point (e.g., mounted to a lead screw) along a length of the bimetallic thermal actuation elements (220, 225), thereby allowing the ratio of the linear displacement of the bimetallic thermal actuation elements (220, 225) to the angular displacement of the platform 205 to be adjusted.

In various embodiments, the bimetallic thermal actuation elements (220, 225) may be coupled to the frame 210 in any appropriate orientation, thereby allowing it to deform in any appropriate direction when heated and cooled, with any appropriate coupling system converting the deformation of the bimetallic thermal actuation elements (220, 225) into a pivoting of the platform 205. In addition, the pivot rate of the platform 205 can be controlled, for example, through selection of the bimetallic thermal actuation elements (220, 225) of appropriate length, thickness, and/or stiffness to ensure that the deformation of the bimetallic thermal actuation elements (220, 225) result in the platform 205 pivoting at a rate necessary to ensure that $\beta = \alpha$ over the desired range of motion of the system 200.

In one embodiment, the functional relationship between the angle of orientation ($\beta$) of a platform affixed to the pivot shaft can be tuned with respect to the angle of impingement of the radiation source ($\alpha$), which is in turn dependent upon the position of the sun in the sky by, for example, adjusting the length of a moment arm that converts a substantially linear displacement of elongate, longitudinally extending bimetallic thermal actuation elements (220, 225) into an angular shaft displacement. For example, the bimetallic thermal actuation elements (220, 225) may be adjustably coupled to the frame 210, (e.g., by being inserted in a slidable mounting structure that allows the free length of the bimetallic thermal actuation elements (220, 225) to be adjusted) to allow tuning of the system 205 to ensure accurate tracking of the solar radiation source.

In one embodiment, a deformation of the bimetallic thermal actuation element (220, 225 causes a linear change in torque and angular displacement experienced by the pivoting shaft 215 at a given constant level of temperature gradient between actuation elements. In addition, the shaft displacement as a function of the temperature difference between the two bimetallic thermal actuation element (220, 225) can be amplified or influenced nonlinearly, and/or with a great degree of freedom by, for example, using a system of gears and/or a generally noncircular cam within the linkage mechanism between the bimetallic thermal actuation element (220, 225) and the pivoting shaft 215. In one embodiment, the system 200 can be configured to pivot the platform 205 at a rate such that it traverses a larger or smaller angular path than that of the radiation source.

In one embodiment, thermal actuation elements for a solar tracking system may include a plurality of bimetallic elements stacked in parallel. An example system 300 including substantially elongate, longitudinally extending stacked bimetallic thermal actuation elements (320, 325) is shown in FIGS. 3A and 3B. In this embodiment, the bimetallic thermal actuation elements (320, 325) include a plurality of bimetallic leaves that are held together by at least one clamping and/or fastening mechanism that maintains physical contact between adjacent leaves during the thermally controlled deformation of the bimetallic thermal actuation elements (320, 325). The clamping/fastening mechanism can permit adjacent leaves to slide substantially freely against one another in an axial direction, while remaining in physical contact, during deformation. A lubricant (e.g., a thermally conductive grease) may be coated on one or more surfaces of one or more leaves, or be otherwise placed between adjacent leaves, to facilitate sliding of the adjacent leaves with respect to one another. Clamping and/or fastening a plurality of leaves together so that they remain in physical contact during deformation may, for example, improve heat conduction between leaves, thereby minimizing the thermal gradient between leaves and, as such, promoting uniform thermal deflection of each bimetallic leaf in the stack.

In the embodiment shown in FIGS. 3A and 3B, the stacked bimetallic thermal actuation elements (320, 325) are clamped, or otherwise coupled, at a proximal end (335, 340) to a frame 210. The stacked bimetallic thermal actuation elements (320, 325) are coupled, at their distal ends (355, 360) to one or more elongate connecting rods or plates (365, 370), which are in turn coupled to the cable 250. In one embodiment, a plurality of elongate connecting rods or plates (365, 370) couple the bimetallic actuation elements (320, 325) to the pivoting shaft 215, either directly or indirectly (e.g., through one or more cables). The cable 250 is wound around the pivoting shaft 215 of a platform 205 to produce a rotational displacement (i.e., pivoting) of the platform 205 in response to a temperature induced deformation of the stacked bimetallic thermal actuation elements (320, 325). In an alternative embodiment, the distal ends (355, 360) of the stacked bimetallic thermal actuation elements (320, 325) may be coupled directly to the cable 250, without the need for any connecting rods. In one embodiment, the system 300 may include an enclosure adapted to reduce convective heat loss and minimize the temperature gradient through the stack of bimetallic actuation elements.

By utilizing a plurality of stacked, parallel bimetallic thermal actuation elements, with the combined force generated by the stack being a function of the force generated by each individual bimetallic elements in the stack, a force needed to create the required angular displacement in the platform 205 may be created by shorter, more compact thermal actuation elements than may possibly, in one embodiment, be utilized for thermal actuation elements including only a single bimetallic element. This may, as a result, allow for the construction of more compact systems than could otherwise be achieved.

One embodiment of the invention includes one or more thermal actuation elements including two separate elongate elements, at least one of which is adapted for temperature induced linear expansion. An example system 400 including linearly expanding thermal actuation elements (420, 425) is shown in FIGS. 4A and 4B. In this embodiment, each thermal actuation element (420, 425) includes one or more upper elongate rods or plates 402 and one or more lower elongate rods or plates 404. The rods (402, 404) are coupled at a proximal end to the frame 210, and at a distal end to a connecting rod or plate (465, 470). In one embodiment, the rods (402, 404) are coupled to the connecting rods (465, 470) though a hinge element (475, 480) (e.g., a double hinge element connecting each of the thermal actuation elements to the rod around a pivot point).

In operation, the materials for the rods (402, 404) are selected such that one of the upper elongate rod 402 and the lower elongate rod 404 undergoes a greater expansion and contraction in response to a change in temperature than the other rod. As a result, the rods (402, 404) will produce a pivoting of the hinge elements (475, 480) as the temperature is increased or decreased, with this pivoting driving the connecting rods (465, 470) and thereby pulling on the cable 250. As a result, a linear expansion and contraction of one of the rods (402, 404) with respect to the other rod can generate an angular displacement in the platform 205, thereby pivoting the platform to track the source of solar radiation, as described herein.

In one embodiment, a response time of the thermally controlled deformation of one or more of the thermal actuation elements is controlled through use of a damping element such as, but not limited to, one or more of thermal mass of the thermal actuation element, thermal resistance between adjacent thermal masses in the thermal actuation element, a heat pipe, an external thermal mass, and/or combinations thereof. For example, increasing or decreasing the mass of a thermal actuation element, for example by adding or removing leaves or by attaching or removing additional material to and from the thermal actuation element, can increase or decrease the damping effect of the thermal actuation element itself (with a more massive thermal actuation element providing greater damping to the system). In one embodiment, the thermal resistance between adjacent layers of a thermal actuation element may be used to control the damping of the system. Utilizing dampening systems to limit the rate at which the thermal actuation elements deform, and thereby pivot the platform, may be useful, for example, in minimizing the effect of brief temperature changes (e.g., due to a cloud passing overhead) while still allowing the platform to accurately track the relatively slow movement of the sun.

Figure 5A:
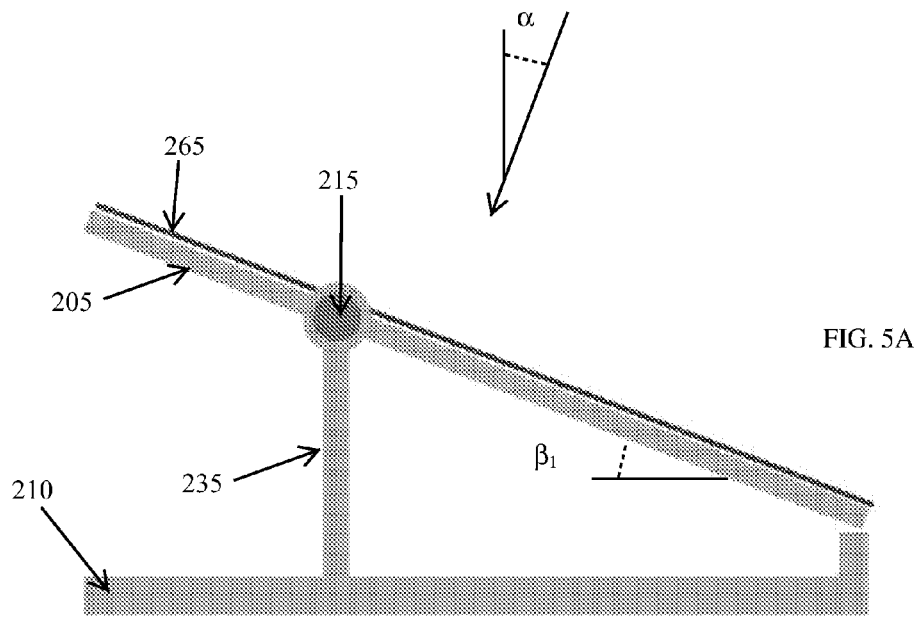
FIG. 5A is a schematic side view of a portion of a solar tracking system oriented towards a solar radiation source, in accordance with one embodiment of the invention.
Figure 5B:
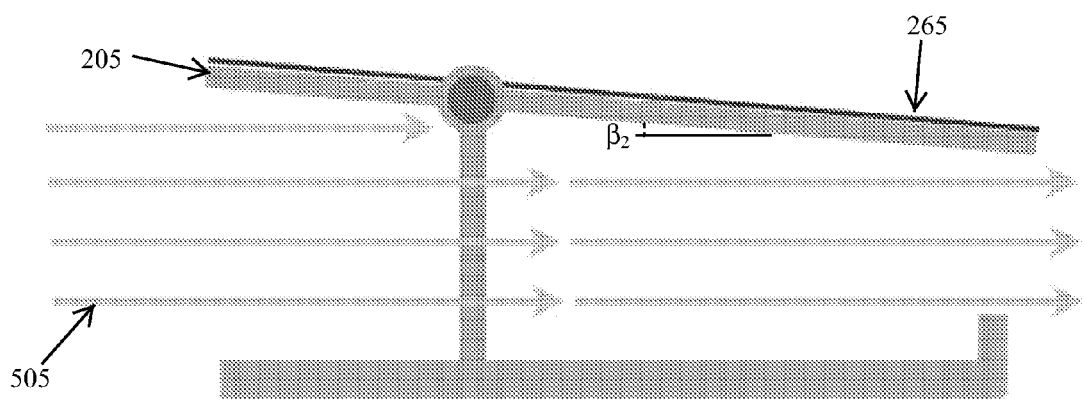
FIG. 5B is a schematic side view of the solar tracking system of FIG. 5A subject to impingement of an airflow on the system platform.
Figure 6A:
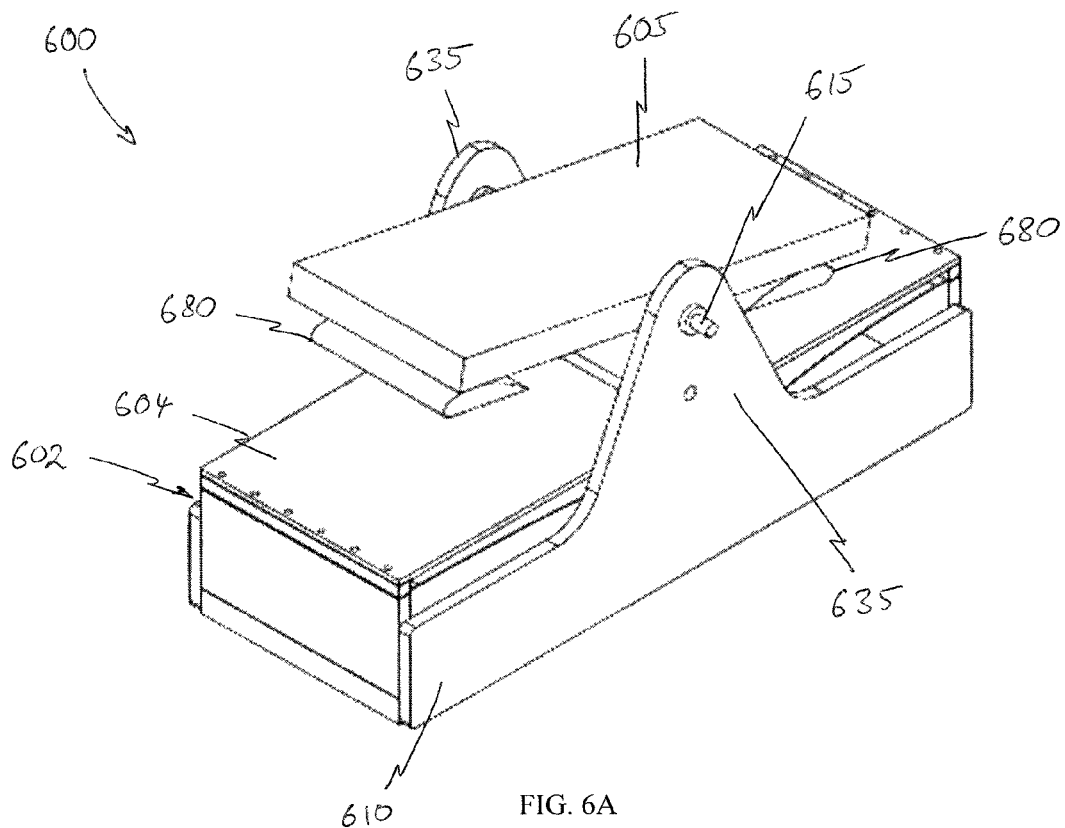
FIG. 6A is a schematic perspective view of an example solar tracking system having an enclosure surrounding the thermal actuation elements, in accordance with one embodiment of the invention.
Figure 6B:
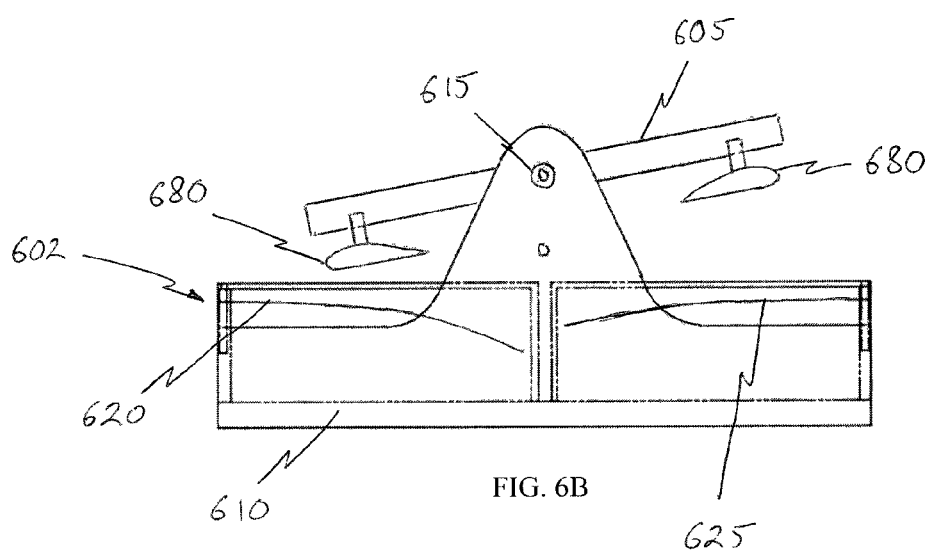
FIG. 6B is a schematic side view of the solar tracking system of FIG. 6A.
Figure 6D:
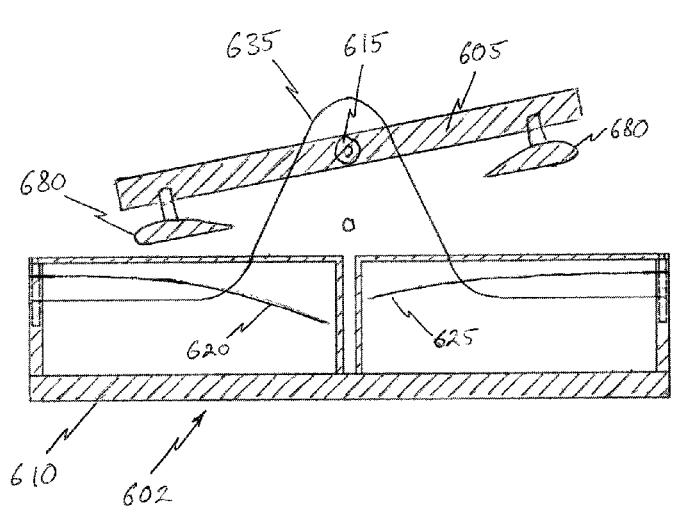
FIG. 6D is a schematic sectional side view of the solar tracking system of FIG. 6C taken along section A-A.
Figure 6C:
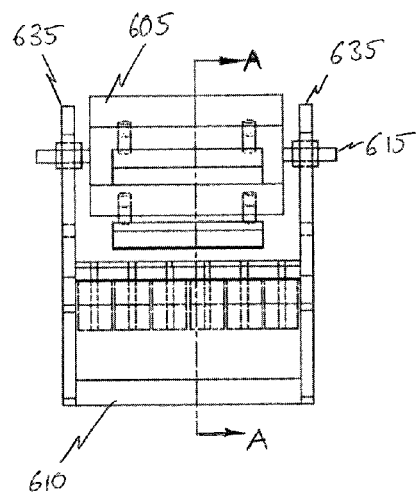
FIG. 6C is a schematic end view of the solar tracking system of FIG. 6A.
Figure 7A:
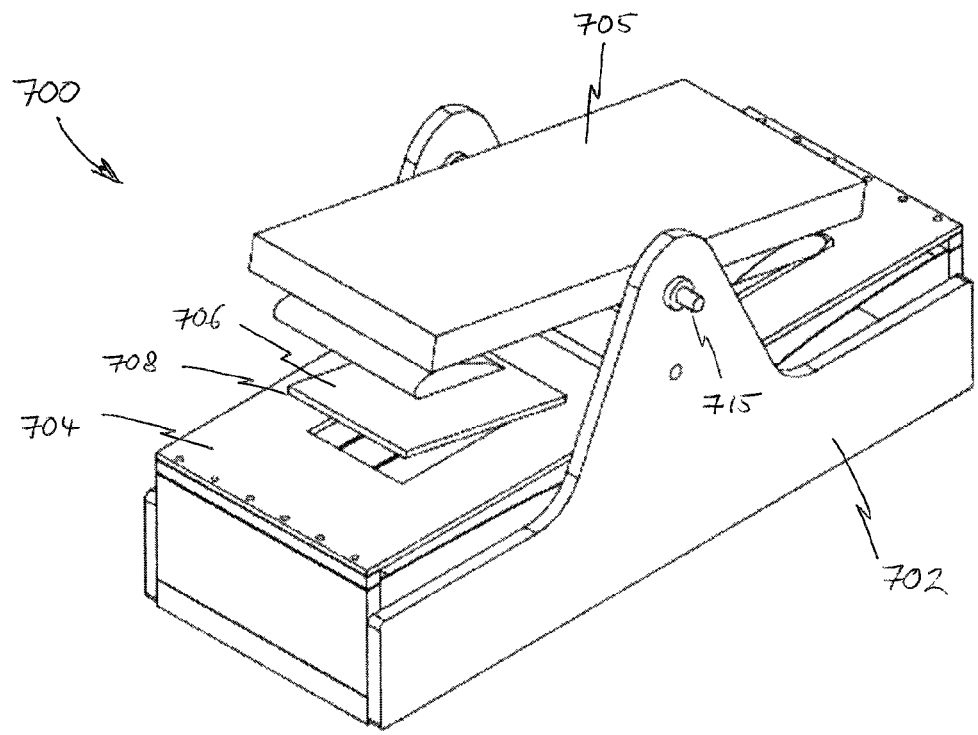
FIG. 7A is a perspective view of an example solar tracking system having an enclosure with shutters surrounding the thermal actuation elements, in accordance with one embodiment of the invention.
Figure 7B:
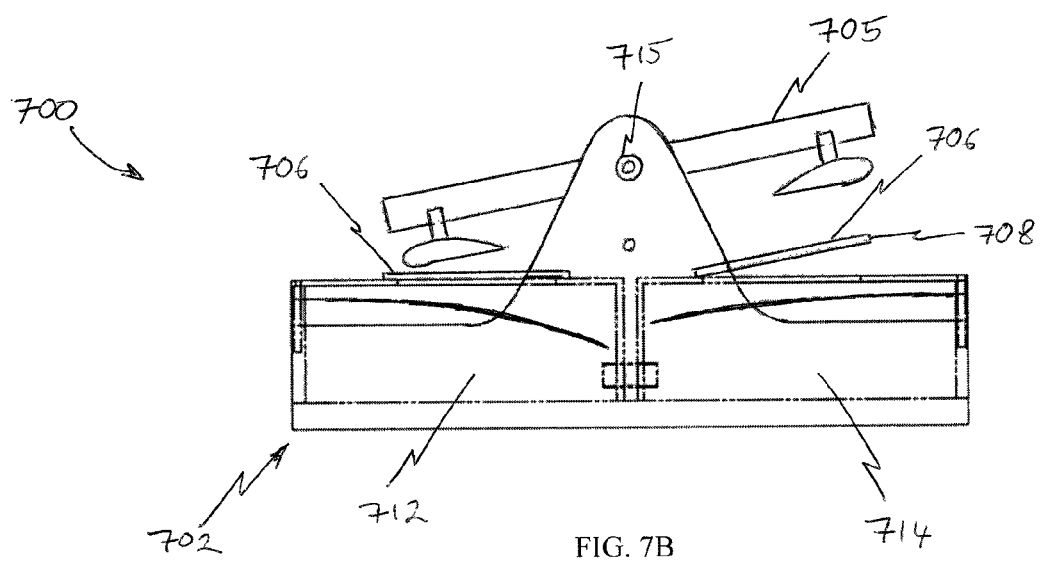
FIG. 7B is a schematic side view of the solar tracking system of FIG. 7A.

In one embodiment, it is possible for the angular position of the platform to be perturbed from its stable, equilibrium position, due to external forces acting upon the system. For example, a cross-wind blowing across the platform may generate enough pressure to overcome the force applied by the thermal actuation elements and pivot the platform from its desired orientation with respect to the solar radiation source. For example, as shown in FIG. 5A, a platform 205 may be held, at one point in time, at an angle ($\beta_1$) to the horizontal plane, with this angle equal to the angle ($\alpha$) of the solar radiation. However, a gust of wind 505, may blow past the platform 205 and generate enough of a pressure differential on the surface of the platform 205 to overcome the force applied by the thermal actuation elements and pivot the platform 205 to a second angle ($\beta_2$), which is less than the angle ($\alpha$) of the solar radiation, as shown in FIG. 5B. As a result, the effect of the gust of wind is to pivot the platform 205 away from its desired orientation (i.e., perpendicular to the solar radiation), thereby reducing the efficiency of the solar panel 265 held thereon.

In addition, a cross-wind blowing over the system may generate excessive convective heat loss from one or both of the thermal actuation elements, thereby resulting in a drop in temperature of the thermal actuation element. This may cause the thermal actuation elements to deform away from their optimal positions, resulting again in a pivoting of the platform 205 away from its desired orientation (perpendicular to the solar radiation), The effects of perturbations caused, for example, by a cross-wind passing over the solar tracking system may be compensated for in a number of ways. For example, the pressure differential generated on the surface of a platform by a cross-wind may be damped out, or substantially or at least partly damped out, through use of features such as, but not limited to, external blocking mechanisms positioned around the solar tracking system to reduce the amount of disturbance force that reaches the system (e.g., through use of a wall or barrier placed around the tracking device to reduce the amount of wind reaching it). The effect of wind may also be compensated for by use of thermal actuation elements having sufficient stiffness to damp out any expected range of perturbation forces, with stiffer thermal actuators having a reduced sensitivity to mechanical disturbance forces present in the environment. In addition, damping mechanisms, for example rotational damping mechanisms located within or around the pivoting shaft and/or linear damping mechanisms in the coupling system between the thermal actuation elements and the pivotable shaft, may be utilized to reduce the effect of a perturbation force on the platform. Example damping mechanisms include, but are not limited to, dashpots, shock absorbers, locking mechanisms, wind activated braking mechanisms, springs, and/or combinations thereof. In one embodiment, one or more airfoil sections may be coupled to the platform to guide the wind flow passing over the platform in order to reduce the pressure differential on the surface of the platform and thereby reduce the perturbation force applied to the platform by the wind.

One embodiment of the invention includes the use of one or more mechanical damping elements that resist any sudden movement of the pivoting platform in addition to, or in place of, one or more dampening elements for the pivotable platform. This mechanical dampening element may, for example, include, or consist essentially of, one or more dashpots that resist angular deflection of the pivotable platform. The dashpot could be configured, for example, as one or more structure mounted to the frame of the tracking system to provide a friction-based resistance to the rotation of the pivotable shaft that the pivotable platform is mounted upon.

For example, the bearings and/or bushings that support the pivotable shaft in one embodiment have a certain level of friction associated with their angular deflection. Damping of the pivoting of the platform may include selection of a different bearing or bushing that has a different amount of associated friction. Alternatively, additional, or in addition, bearings or bushings may be mounted to the frame with the pivotable shaft mounted through them as well, to increase the overall friction experienced by the pivotable shaft. Such a feature can control the mechanical frequency response of the structure and make it insensitive, or substantially insensitive, to any sudden disturbance. Just as electrical systems have an RC time constant and thermal systems have a time constant associated with heat capacitance and thermal resistance, mechanical systems have a mechanical response time associated with mechanical stiffness (e.g., stiffness of the bimetallic elements) and mechanical damping (e.g., the mechanical damping elements referred to herein). Utilization of such damping methods within the structure may, in certain embodiments, allow the structure to better resist sudden disturbances by including mechanical damping elements that cause sudden forces in the system to quickly die away and permit slow, sustained forces in the system, such as the force from the thermal actuation elements, to persist.

The systems and methods described herein may also include features for controlling the convective heat loss from one or more of the thermal actuation element due to environmental effects (e.g., a cross-wind). For example, an enclosure adapted to allow transmission of energy from the radiation source therethrough, to the thermal actuation elements, while controlling air flow proximate the thermal actuation element, may be utilized to prevent or control airflow over the thermal actuation elements. The enclosure, may include, or consist essentially of, a transparent, or at least partially transparent, box in which the thermal actuation elements are housed. The box may be constructed from any appropriate materials, with the transparent portions, for example, constructed from a glass and/or transparent plastic.

An example solar tracking system 600, including an enclosure 602, is shown in FIGS. 6A to 6D. In this embodiment, bimetallic thermal actuation elements (620, 625) are coupled at their respective proximal ends to a frame 610 of an enclosure 602. The frame 610 includes two support columns 635 on which a platform 605 is pivotably supported through a central pivoting shaft 615 which is pivotably mounted to the central support columns 635. The angular displacement of the platform 605 may be controlled by any of the actuation systems described herein, such as, but not limited to, one or more cables attached to the respective distal ends of the thermal actuation elements (620, 625), with a central portion of the cable wound around the pivoting shaft 615 of the platform 605. The platform 605 may support any appropriate solar element, mirror, and/or tracking or measurement device.

The enclosure 602 provides a barrier that prevents, or partially prevents, convective heat loss from a cross-wind from effecting the deformation of the bimetallic thermal actuation elements (620, 625) in response to solar radiation impinging thereon. The enclosure 602 includes a transparent upper cover 604 that allows solar radiation to impinge on the bimetallic thermal actuation elements (620, 625), while preventing wind from entering the enclosure 602. As a result, the enclosure 602 limits perturbations to the system 600, thereby improving the accuracy of the solar tracking and improving the efficiency of a solar panel, or other element, attached thereto.

In one embodiment of the invention, the system 600 also includes airfoil elements 680 that are coupled to the underside of the platform 605. These airfoil elements 680 are adapted to control the flow of a cross-wind over the surface of the platform 605, thereby damping perturbations to the system 600 through pressure differentials above and below the platform 605 as wind flows past the system 600. The airfoil elements 680 may be of any appropriate size, shape, and aspect ratio necessary to produce the required aerodynamic damping to the platform 605.

Another system 700 including an enclosure 702 is shown in FIGS. 7A to 7E. In this embodiment, the enclosure 702 includes one or more shutters 706 within, or above, the upper cover 704. These shutters 706 are adapted to open on the side of the system 700 further away from the source of solar radiation (i.e., on the side of the system 700 where the platform 705 blocks energy from the radiation source from impinging on the thermal actuation element to a greater extent), while remaining closed on the side of the system having the thermal actuation element that is being preferentially heated by the solar radiation source. This may be achieved, for example, by coupling a distal end 708 of the shutters 706 to the platform 705, for example through one or more cables. As a result, as the platform 705 pivots about its central pivoting shaft 715, the side of the platform 705 that is pivoted upwards will pull the associated shutter open, while the shutter on the side of the platform 705 that is pivoted downwards will remain closed. In an alternative embodiment, any appropriate mechanical, pneumatic, hydraulic, and/or electromagnetic system may be utilized to open and close the shutters 706.

By opening a shutter 706 in the side of the enclosure away from the solar radiation source, the open shutter can allow air to flow into the enclosure, thereby increasing the convective heat loss of the thermal actuation element further away from the solar radiation source. This can, in turn, increase the temperature difference between the two thermal actuation elements, which can aid in producing a force sufficient to produce a required angular displacement in the platform 705 and modify the response time of the system 700. In one embodiment, the enclosure 702 can be split into two separate sections (712, 714), with each section enclosing a single thermal actuation element. As a result, opening a shutter 706 in one section of the enclosure 702 will only increase the convective heat loss in the thermal actuation element within that enclosure section, without affecting the other thermal actuation element.

Figure 8:
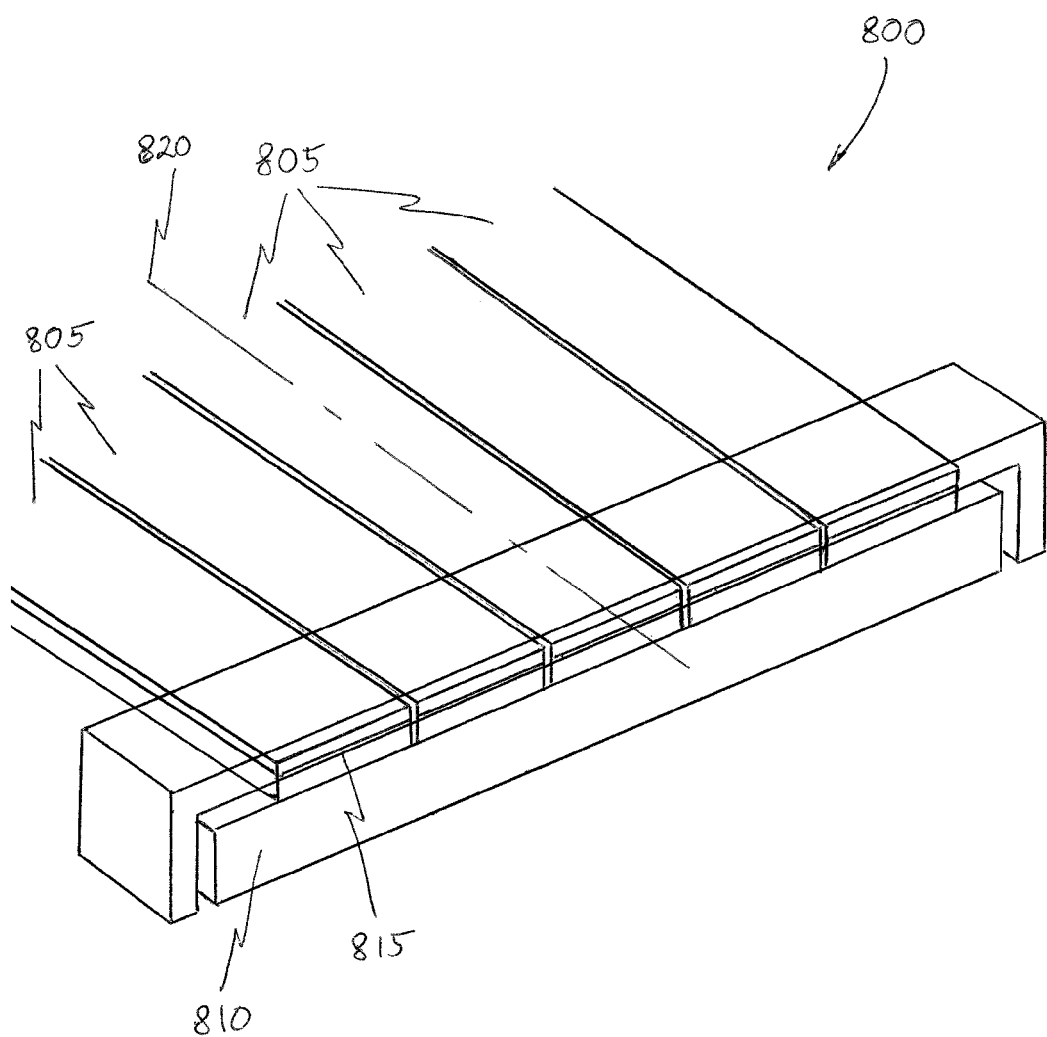
FIG. 8 is a schematic perspective view of a clamping system for a thermal actuation element of a solar tracking system, in accordance with one embodiment of the invention.

In one embodiment, a thermal actuation element may include a plurality of adjacent bimetallic strips, with each bimetallic strip contributing to the force being applied to pivot the platform. An example thermal actuation element 800 including a plurality of bimetallic strips 805 can be seen in FIG. 8. In one embodiment, bimetallic thermal actuation elements, such as, but not limited to, the bimetallic strips 805, may be coupled to a frame through a c-clamp 810 or other type of clamping or retention arrangement, thereby holding a proximal end 815 of the bimetallic strips 805 to the frame while allowing them to expand freely in a direction perpendicular to the elongate axis 820 of the bimetallic strips 805. As a result, the bimetallic strips 805 can deform in the manner necessary to generate the force for angularly displacing a pivotable platform while not putting undue stress on the frame due to expansion of the bimetallic strips 805 perpendicular to the elongate axis 820. In an alternative embodiment, any appropriate mechanical, magnetic, and/or adhesive clamping mechanisms may be used to couple various elements of the systems described herein.

Figure 9A:
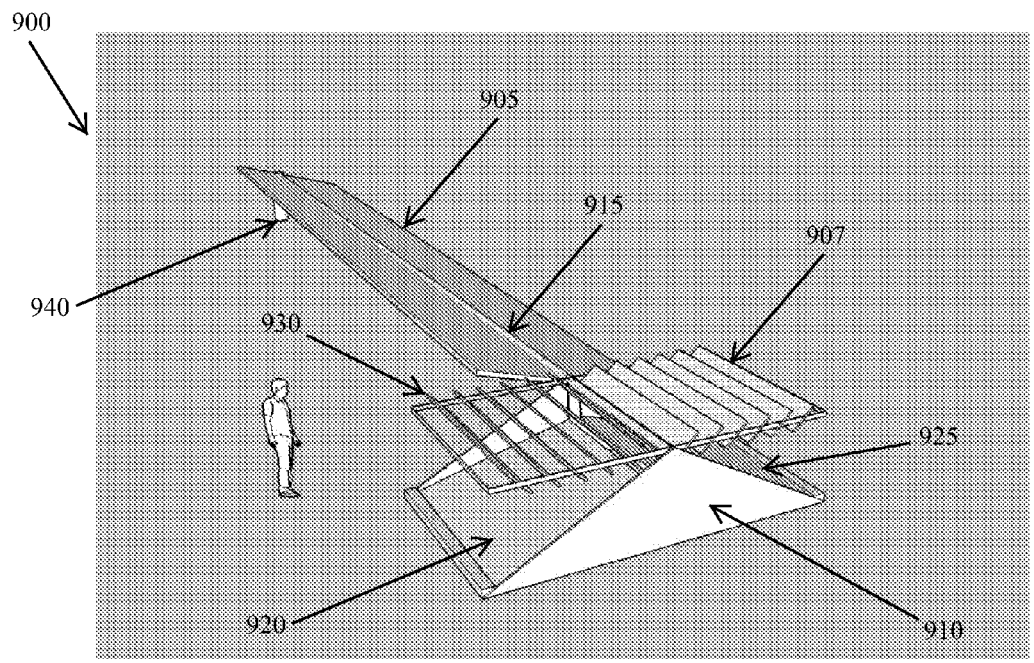
FIG. 9A is a perspective view of a solar tracking system with a stationary shading platform, in accordance with one embodiment of the invention.
Figure 9B:
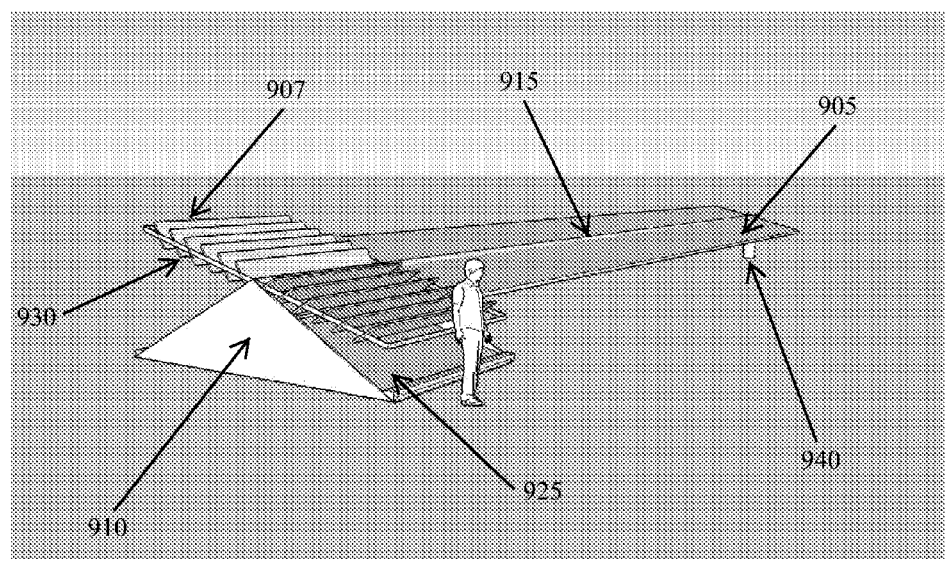
FIG. 9B is a perspective view of a solar tracking system with a pivotable shading platform, in accordance with one embodiment of the invention.

One embodiment of the invention includes a solar tracking system 900 having a separate mounting platform 905 (onto which one or more solar elements may be mounted) and shading platform 907, as shown in FIGS. 9A and 9B. The system 900 includes a frame 910 onto which thermal actuation elements (920, 925) are mounted. The thermal actuation elements (920, 925) may, for example, be elongate, longitudinally extending bimetallic thermal actuation elements. The shading platform 907 is positioned at least partially above the thermal actuation elements (920, 925) to at least partially block energy from the radiation source from impinging on the thermal actuation elements (920, 925). The mounting platform 905 extends to one side of the frame 910, clear, or at least partially clear, of the thermal actuation elements (920, 925), and pivots about a central pivoting shaft 915. The central pivoting shaft 915 can be coupled to the thermal actuation elements (920, 925) by any of the coupling elements and methods described herein. In an alternative embodiment, mounting platforms 905 may extend to both sides of the frame 910.

In operation, the shading platform 907 provides the required shading to drive the thermally induced deformation of the thermal actuation elements (920, 925) used to drive the radial displacement of the mounting platform 905. The shading platform 907 may, in one embodiment, be fixedly attached to the frame 910, thereby providing a stationary shading mechanism for the system, as shown in FIG. 9A. In an alternative embodiment, the shading platform 907 pivots about the central pivoting shaft 915, along with the mounting platform 905, in response to a thermally induced deformation of at least one of the thermal actuation elements (920, 925), as shown in FIG. 9B. In a further embodiment, the shading platform 907 may pivot about the central pivoting shaft 915 separately and uncoupled from the mounting platform 905.

The shading platform 907 includes a plurality of shutter elements 930. Various embodiments may include any number of shutter elements of any size, shape, and orientation, as appropriate. The shutter elements 930 are angled symmetrically about the central pivoting shaft 915, with a first plurality of shutter elements 930 positioned about the thermal actuation elements 920 and oriented at a first angle, and a second plurality of shutter elements 930 positioned about the thermal actuation elements 925 and oriented at a second angle, symmetrically opposed to the angle of orientation of the first plurality of shutter elements 930. In one embodiment, each of the shutter elements 930 covering a thermal actuation element may be oriented at the same angle. In an alternative embodiment, various shutter elements 930 covering a thermal actuation element may be oriented at different angles. In one embodiment, the angling of the shutters covering each of the thermal actuation elements (920, 925) may be non-symmetric. In one embodiment, the shading platform 907 may include, or consist essentially of, a flat or curved plate or a polarized element, in addition to, or in place of, the shutter elements 930.

In one embodiment, the mounting platform 905 is supported, at a distal end, by a support element 940, thereby allowing the mounting platform 905 to be pivotably supported at both ends of its width. In an alternative embodiment, the mounting platform 905 extends out from the frame 910 without any further support at its distal end.

Figure 10:
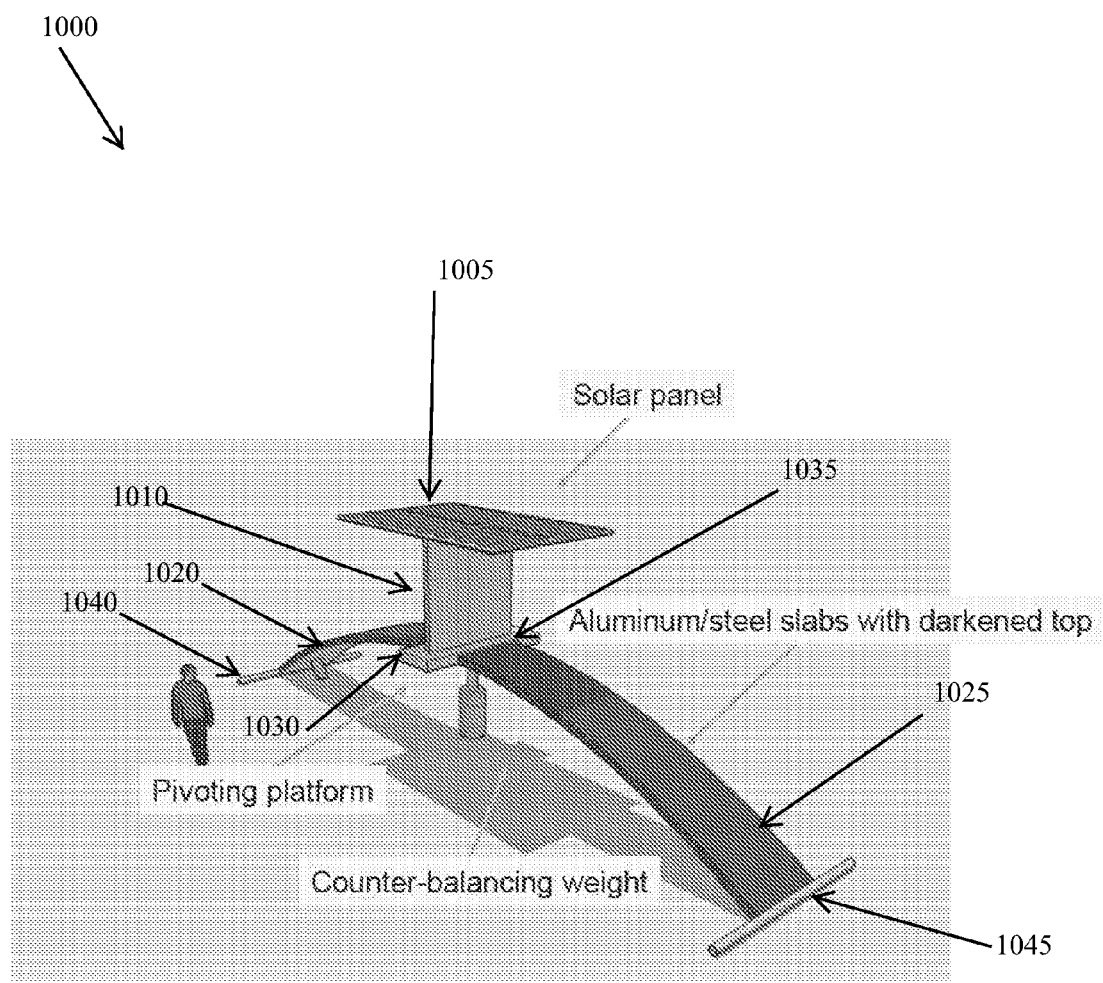
FIG. 10 is a perspective view of another tracking system, in accordance with one embodiment of the invention.

Another embodiment of the invention may include a solar tracking system 1000 including a platform 1005 mounted to a pivoting mount 1010, as shown in FIG. 10. The pivoting platform 1010 is coupled to a first thermal actuation element 1020 and a second thermal actuation element 1025. The thermal actuation elements (1020, 1025) are coupled at their proximal end (1030, 1035) to the pivoting platform 1010, and are anchored at their distal end (1040, 1045) to the surface on which they stand. In this embodiment, each of the thermal actuation elements (1020, 1025) deform, either through linear expansion and/or increasing and decreasing in curvature, in response to a temperature change as described hereinabove. As before, the platform 1005 at least partially shades the thermal actuation element further from the radiation source, while allowing a greater portion of radiation to impinge upon the thermal actuation element nearer the radiation source, with the resulting deformation of the thermal actuation elements producing a force and/or displacement that provides a controlled pivoting of the platform 1005. The platform 1005 and thermal actuation elements (1020, 1025) may be of any appropriate size and shape, and be formed from any or the materials described herein.

In various embodiments, a platform for a solar panel or collector may be configured to shade various portions of a thermal actuation element. For example, the platform may be sized and positioned such that it can shade any portion of a thermal actuation element between 0% to 100% of the cross-sectional area of the thermal actuation element (for example up to about 20%, 50%, 75%, etc) further from the radiation source for a given angle $\alpha$. While the platform may also shade at least a portion of the thermal actuation element nearer to the radiation source, the percentage of the thermal actuation element nearer to the radiation source that is shaded for a given angle $\alpha$ will be lower than that for the thermal actuation element further from the radiation source for any angle $\alpha > 0$.

In one embodiment, one or more separate, fixed position or pivotable, shading elements may be utilized to provide the appropriate shading to the thermal actuation elements. These elements may be in addition to, or instead of, shading from the pivotable platform. For example, one or more plates may be positioned on, or above, one or more of the thermal actuation elements to provide additional shading, with the plates oriented such that they only provide shading to the thermal actuation element farther from the radiation source.

Figure 11A:
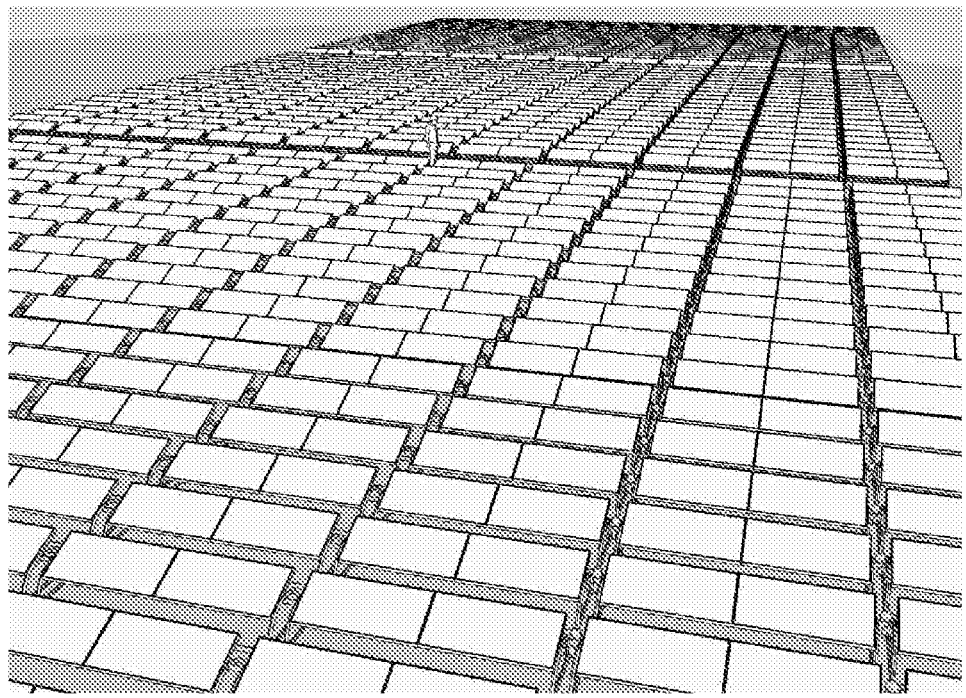
FIG. 11A is a perspective view of an array of solar tracking systems, in accordance with one embodiment of the invention.
Figure 11B:
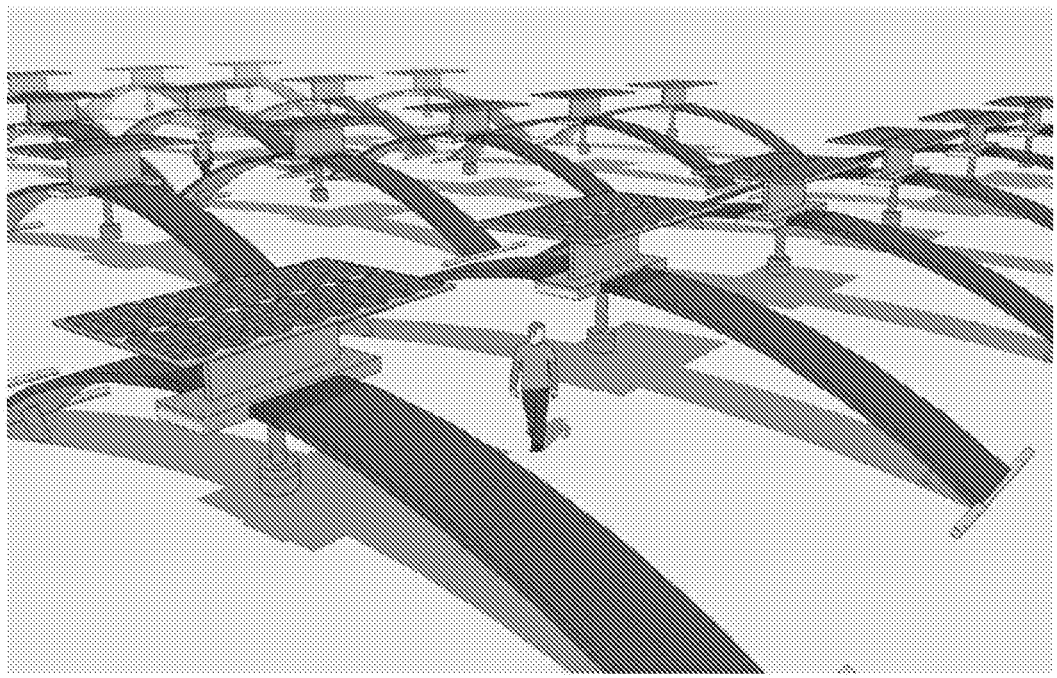
FIG. 11B is a perspective view of another array of solar tracking systems, in accordance with one embodiment of the invention.

In one embodiment, a plurality of any of the solar tracking systems described herein can be arranged to form a distributed cluster power system, with the power generated by each of the individual solar tracking systems being combined to provide power on a large scale. Example distributed cluster power systems, utilizing a plurality of solar tracking systems, are shown in FIGS. 11A and 11B. The cluster may include any appropriate number of solar tracking systems, and may be arranged in any appropriate manner.

In one embodiment, the systems described herein may be oriented such that the platform is parallel, or substantially parallel, with the ground when the same amount of solar energy is impinging upon each thermal actuation element. This may be beneficial, for example, in solar tracking systems located near the equator, where the sun passes directly overhead. In an alternative embodiment, the system may be fixedly, or adjustably, pitched at an angle to the ground, so that the system may track a solar radiation source that traverses the sky without passing directly over the solar tracking system. This allows the solar tracking systems described herein to produce solar power with maximum efficiency even at higher latitudes, as the platform may be pitched at any angle necessary to hold a solar panel or collector in an orientation as close to perpendicular to the sun as possible.

In one embodiment, the systems described herein may include a plurality of thermal actuation elements adapted to pivot the support platform around two separate, perpendicular, pivot axes, thereby allowing for two-axis tracking of a solar radiation source. This may be achieved, for example, by having a first frame pivotably coupled to the platform and operating as described above, with this first frame pivotably coupled to a second base frame, with the base frame allowing the first frame to pivot in a direction perpendicular to the platform. The pivoting of the first frame with respect to the second frame may function according to the methods and devices described hereinabove. Alternatively, a separate passive or active pivoting device may be used to control the pivoting of the first frame with respect to the second base frame.

Figure 12A:
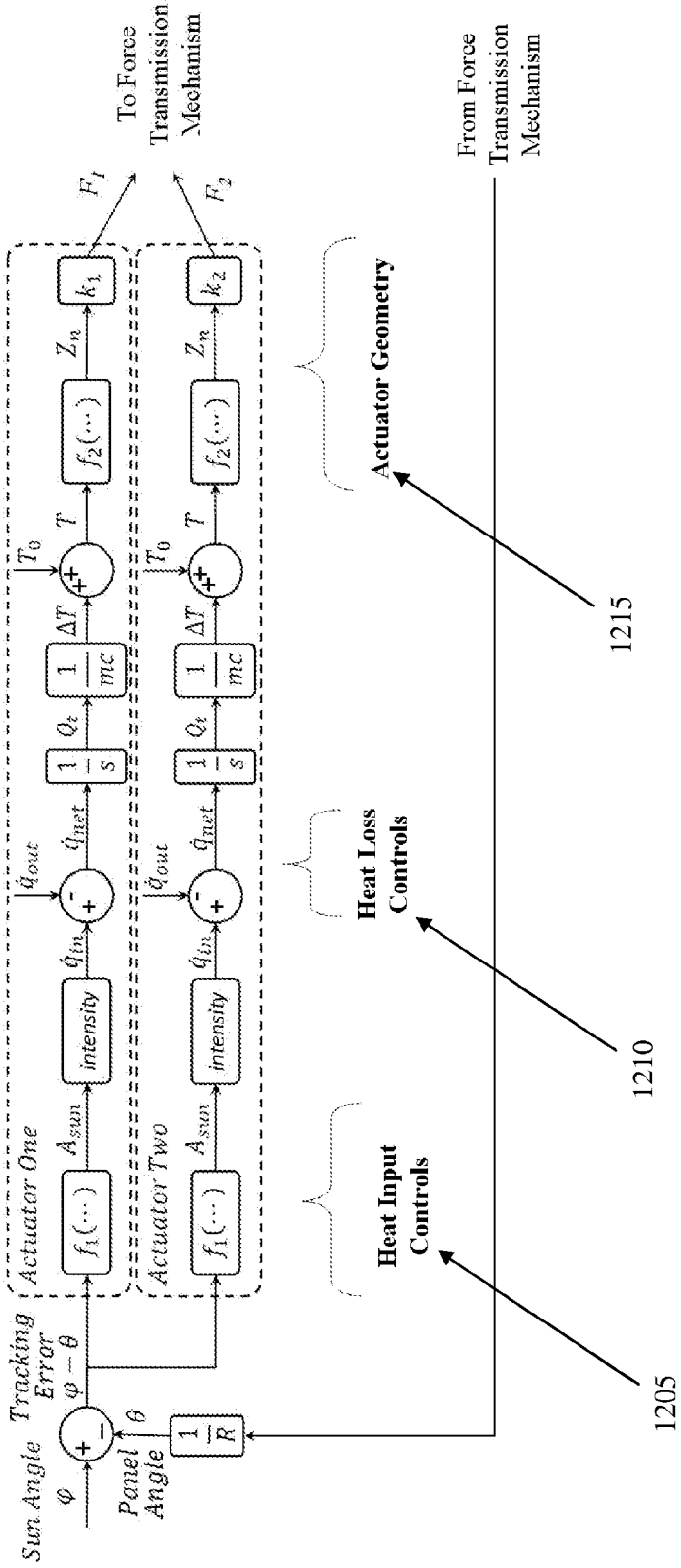
FIG. 12A is a flow chart of an actuator mechanism for a control algorithm for a solar tracking system, in accordance with one embodiment of the invention.
Figure 12B:
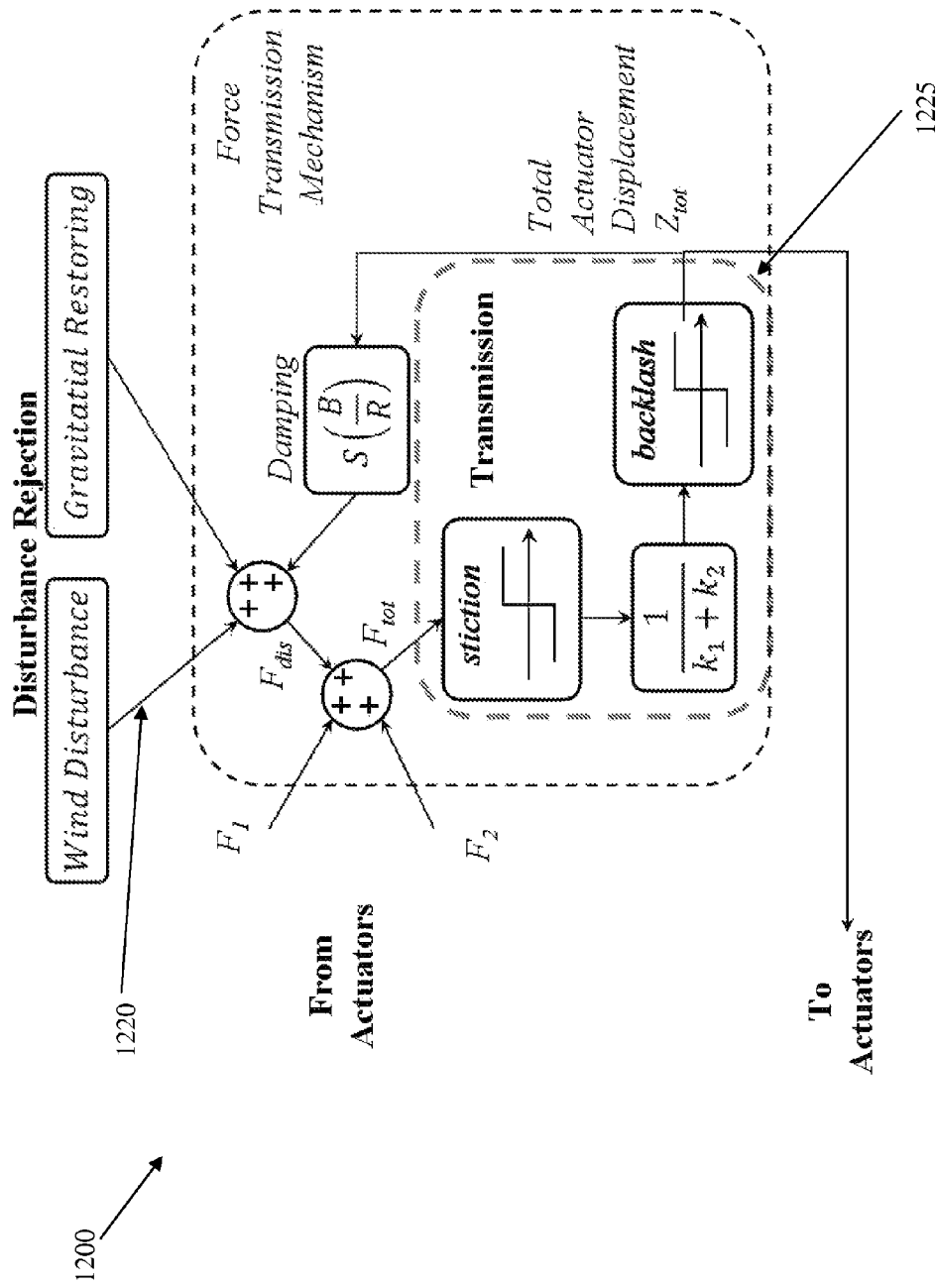
FIG. 12B is a flow chart of a force transmission mechanism for the control algorithm of FIG. 12A.
Figure 12D:
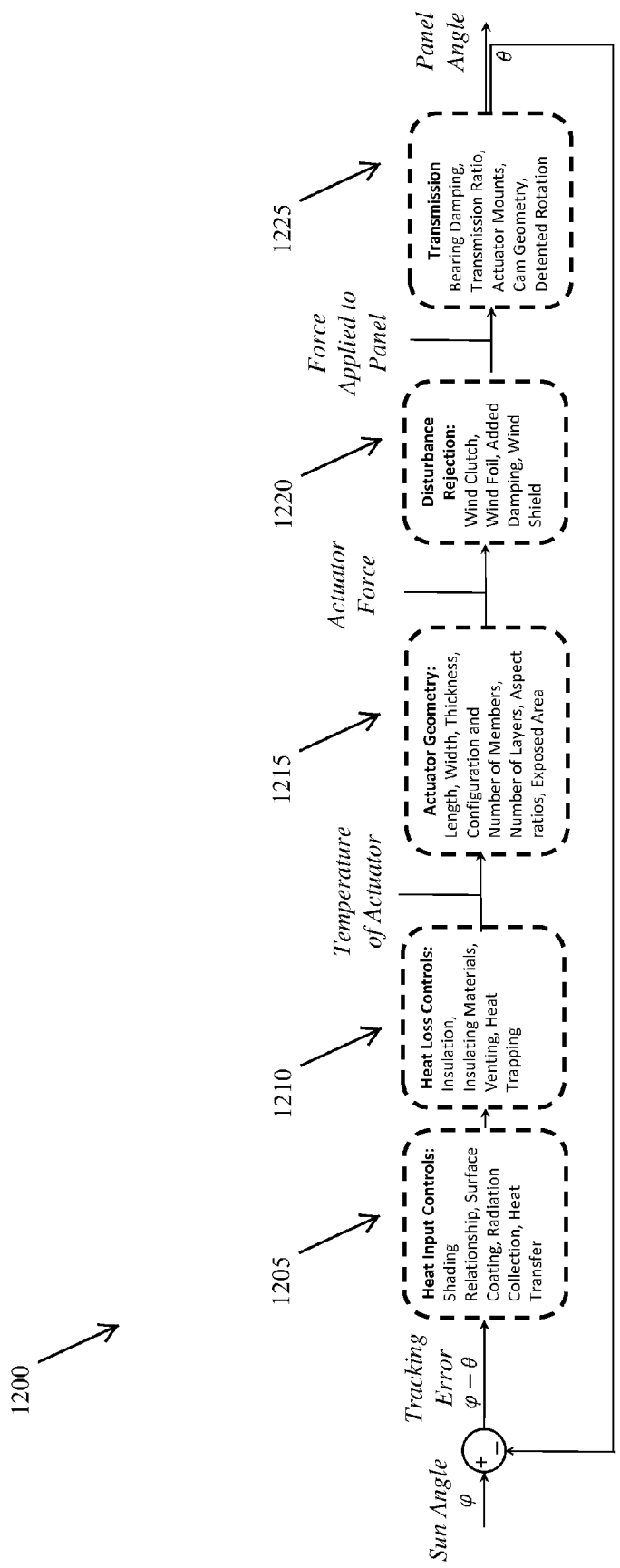
FIG. 12D is a flow chart of control parameters for the actuator mechanism of FIGS. 12A to 12B.

An algorithm for a system 1200 showing the relation between the pivot angle of solar panel or solar connector and the angle of a source of the solar radiation (e.g., from the sun) is shown in FIGS. 12A to 12D. The control system 1200 indicates the adjustment to each of two thermal actuators in response to a change in sun angle, with the effect of wind disturbance, stiction, and damping also accounted for in determining the angle of the panel with respect to the horizontal for a given sun angle. In one embodiment, the algorithm may be utilized to select appropriate design parameters for a system 1200 having any number and orientation of shading elements and/or thermal actuation elements. A simplified algorithm, showing the relevant control parameters, is shown in FIG. 12D.

The system 1200 allows for the control of a number of parameters to correctly control the orientation of a mounting/shading platform, including, but not limited to, controlling the heat input 1205 through selection of appropriate shading elements (e.g., through selection of the geometry and materials of various shading elements to control the shading relationship, through selection of the surface coating for various elements, through appropriate radiation collection, and/or through selection of the materials and configurations of elements to control heat transfer within and between various elements of the apparatus). The system also allows for heat loss control 1210 (e.g., through insulation, material selection, venting, and/or heat trapping) and thermal actuation element geometry selection 1215 (e.g., through selection of the material properties and dimensions of the thermal actuation elements, the number of thermal actuation elements, the number of bimetallic layers in a thermal actuation element, the aspect ratio of the thermal actuation elements, and/or the exposed area of each thermal actuation elements at a given angle of the radiation source to the apparatus). Further control of the system 1200 may be achieved through disturbance rejection 1220 (e.g., through one or more wind clutch, wind foil, added damping, and/or wind shield) and/or through transmission control 1225 (e.g., through bearing damping, gearing, transmission ratio selection, actuator mounting, cam geometry, and/or detented rotation).

The invention may utilize conventional powered elements in combination with the passive systems described herein. In one embodiment, a solar tracking system may include a heater system (e.g., in the form of a flexible conductive trace in intimate contact with the thermal actuators). The heaters may be used, for example, to supply additional heat to the thermal actuation elements to further control their temperature (for example, to raise their temperature above ambient by applying an electrical current through the heater trace). This effect could be used, for example, to drive the thermal actuation elements into a new position and/or compensate for minor tracking errors through adjustments and fine-tuning of the thermal gradient between thermal actuation elements.

For example, in one embodiment, the power of the sun is used to directly supply heating of the thermal actuation elements and drive tracker motion with gross angular precision. By utilizing one or more heating systems in addition to this solar heating, errors in tracking arising, for example, due to environmental influences such as wind cooling, external shading or reflection of sunlight in the direction of the tracker, may be compensated for by supplying additional heat to counteract the error and maintain a the thermal gradient that is necessary for accurate tracking. Note that the power output to the heaters in this scheme is far lower than would be required if the sun were not illuminating the bimetallic elements, with the power only required to provide a "corrective" signal. This correction could also be used to optimize performance on hot vs. cold days, with the efficiency of the tracking system (defined as power collected by panel/power output to heaters) a function of power collected by the panel (which conceivably tracks with higher precision) and ambient conditions on the day in which it is tracking.

It should be understood that alternative embodiments, and/or materials used in the construction of embodiments, or alternative embodiments, are applicable to all other embodiments described herein.

The invention may be embodied in other specific forms without departing from the spirit or essential characteristics thereof. The foregoing embodiments, therefore, are to be considered in all respects illustrative rather than limiting the invention described herein. Scope of the invention is thus indicated by the appended claims, rather than by the foregoing description, and all changes that come within the meaning and range of equivalency of the claims are intended to be embraced therein.

What is claimed is:

1. A system for controlling angular position of a pivotable platform relative to a radiation source, the system comprising:
   a frame;
   a platform pivotably coupled to the frame;
   a thermal actuation element coupled to the frame and adapted to pivot the platform to substantially track a movement of the radiation source, wherein the pivotable platform is adapted to at least partially block energy from the radiation source from impinging on the thermal actuation element; and
   means for dampening disturbances to the pivotable platform selected from the group consisting of a wind shield, an airfoil, a wind activated braking mechanism, and combinations thereof.

2. The system of claim 1, wherein a surface area of the thermal actuation element that the pivotable platform blocks from the radiation source is dependent upon at least one of a position of the radiation source and an angle of the platform.

3. The system of claim 1, wherein the thermal actuation element is coupled at a distal end to a means for pivoting the platform.

4. The system of claim 1, wherein the thermal actuation element is coupled at a proximal end to the frame by a mounting structure.

5. The system of claim 1, wherein the thermal actuation element comprises a substantially elongate bimetallic element.

6. The system of claim 1, comprising a plurality of thermal actuation elements.

7. The system of claim 1, comprising two thermal actuation elements arranged substantially symmetrically about a pivot axis of the platform.

8. A system for controlling angular position of a pivotable platform relative to a radiation source, the system comprising:
   a frame;
   a platform pivotably coupled to the frame;
   a thermal actuation element coupled to the frame and adapted to pivot the platform to substantially track a movement of the radiation source, wherein the pivotable platform is adapted to at least partially block energy from the radiation source from impinging on the thermal actuation element; and
   means for controlling convective heat loss from the thermal actuation element comprising an enclosure adapted to permit transmission of energy from the radiation source to the thermal actuation element while controlling air flow proximate the thermal actuation element, and wherein the enclosure comprises a shutter adapted to control the air flow.

9. The system of claim 8, wherein a surface area of the thermal actuation element that the pivotable platform blocks from the radiation source is dependent upon at least one of a position of the radiation source and an angle of the platform.

10. The system of claim 8, wherein the thermal actuation element is coupled at a distal end to a means for pivoting the platform.

11. The system of claim 8, wherein the thermal actuation element is coupled at a proximal end to the frame by a mounting structure.

12. The system of claim 8, wherein the thermal actuation element comprises a substantially elongate bimetallic element.

13. The system of claim 12, wherein the bimetallic element comprises a plurality of leaves held together by at least one clamping and fastening mechanism that maintains physical contact between adjacent leaves during thermally controlled deformation of the bimetallic element, the clamping and fastening mechanism permitting adjacent leaves to slide substantially freely against one another in an axial direction while remaining in physical contact.

14. The system of claim 8, comprising a plurality of thermal actuation elements.

15. The system of claim 14, wherein at least two of the plurality of thermal actuation elements are arranged in parallel.

16. The system of claim 8, comprising two thermal actuation elements arranged substantially symmetrically about a pivot axis of the platform.

17. The system of claim 8, wherein the thermal actuation element comprises two separate elongate elements coupled at a proximal end to the frame, at least one of the elongate elements adapted for temperature induced linear expansion.

18. The system of claim 17, wherein the two elongate elements are coupled to the means for pivoting the pivotable platform through a hinge element.

19. The system of claim 8, wherein the thermal actuation element is coupled to the platform through a coupling element selected from the group consisting of at least one gear, rod, cable, pivoting shaft, cam, and combinations thereof.

20. The system of claim 19, wherein the cable is wrapped around a pivotable shaft coupled to the pivotable platform.

* * * * *